(12) United States Patent
Monti et al.

(10) Patent No.: US 12,443,529 B2
(45) Date of Patent: Oct. 14, 2025

(54) TAGGED-DATA PREDICTION

(71) Applicant: Arm Limited, Cambridge (GB)

(72) Inventors: Paolo Monti, Quattordio (IT); Luca Nassi, Antibes (FR); Muhammed Enes Topçu, Antibes (FR); Alexander James Pane, Vallauris (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/422,078

(22) Filed: Jan. 25, 2024

(65) Prior Publication Data

US 2025/0245154 A1    Jul. 31, 2025

(51) Int. Cl.
    *G06F 12/0811*    (2016.01)
    *G06F 9/38*    (2018.01)
    *G06F 12/0802*    (2016.01)

(52) U.S. Cl.
    CPC ........ *G06F 12/0811* (2013.01); *G06F 9/3832* (2013.01); *G06F 12/0802* (2013.01)

(58) Field of Classification Search
    CPC ............. G06F 12/0802; G06F 12/0811; G06F 12/0897; G06F 9/3832
    USPC ........................................ 711/122, 118, 144
    See application file for complete search history.

(56) References Cited

U.S. PATENT DOCUMENTS

| | | | |
|---|---|---|---|
| 2011/0289300 A1* | 11/2011 | Beaumont-Smith | G06F 9/3806 712/240 |
| 2018/0074957 A1* | 3/2018 | Cheng | G06F 12/0862 |
| 2019/0155750 A1* | 5/2019 | Wang | G06F 12/0811 |

OTHER PUBLICATIONS

Arm® Architecture Reference Manual, Armv8, for Armv8—A architecture profile, 2013-2020, 13 pages.

\* cited by examiner

*Primary Examiner* — Hashem Farrokh
(74) *Attorney, Agent, or Firm* — NIXON & VANDERHYE P.C.

(57) ABSTRACT

An apparatus has cache data storage, and tagged-data prediction circuitry to generate a tagged-data prediction in response to a streaming-write request requesting that write data corresponding to a target address which missed in a previous level of cache is written to the cache data storage for the given level of cache without being allocated into the previous level of cache. The tagged-data prediction is indicative of whether a target cache data entry corresponding to the target address of the streaming-write request is predicted to be a tagged cache data entry that stores cached data associated with the target address and a valid memory safety check tag corresponding to the target address, or an untagged cache data entry that stores the cached data but does not store a valid memory safety check tag. Cache access scheduling circuitry selects, based on the tagged-data prediction generated by the tagged-data prediction circuitry for the streaming-write request, how to schedule access to the cache data storage in response to the streaming-write request.

20 Claims, 10 Drawing Sheets

TAGGED-DATA PREDICTION

BACKGROUND

Technical Field

The present technique relates to the field of caches.

Technical Background

A data processing apparatus may have a cache for caching data obtained from a memory system. Data cached in the cache can be accessed faster by processing circuitry than if the data has to be accessed from memory.

SUMMARY

At least some examples of the present technique provide an apparatus comprising:
cache data storage to store data for a given level of cache, the cache data storage comprising a plurality of cache data entries;
tagged-data prediction circuitry to generate a tagged-data prediction in response to a streaming-write request requesting that write data corresponding to a target address which missed in a previous level of cache is written to the cache data storage for the given level of cache without being allocated into the previous level of cache,
the tagged-data prediction being indicative of whether a target cache data entry corresponding to the target address of the streaming-write request is predicted to be a tagged cache data entry that stores cached data associated with the target address and a valid memory safety check tag corresponding to the target address, or an untagged cache data entry that stores the cached data but does not store a valid memory safety check tag;
and
cache access scheduling circuitry to select, based on the tagged-data prediction generated by the tagged-data prediction circuitry for the streaming-write request, how to schedule access to the cache data storage in response to the streaming-write request.

At least some examples of the present technique provide a system comprising:
the apparatus described above, implemented in at least one packaged chip;
at least one system component; and
a board,
wherein the at least one packaged chip and the at least one system component are assembled on the board.

At least some examples of the present technique provide a chip-containing product comprising the system described above assembled on a further board with at least one other product component.

At least some examples of the present technique provide a non-transitory computer-readable medium to store computer-readable code for fabrication of an apparatus comprising:
cache data storage to store data for a given level of cache, the cache data storage comprising a plurality of cache data entries;
tagged-data prediction circuitry to generate a tagged-data prediction in response to a streaming-write request requesting that write data corresponding to a target address which missed in a previous level of cache is written to the cache data storage for the given level of cache without being allocated into the previous level of cache,
the tagged-data prediction being indicative of whether a target cache data entry corresponding to the target address of the streaming-write request is predicted to be a tagged cache data entry that stores cached data associated with the target address and a valid memory safety check tag corresponding to the target address, or an untagged cache data entry that stores the cached data but does not store a valid memory safety check tag;
and
cache access scheduling circuitry to select, based on the tagged-data prediction generated by the tagged-data prediction circuitry for the streaming-write request, how to schedule access to the cache data storage in response to the streaming-write request.

At least some examples of the present technique provide a method comprising:
receiving, at a given level of cache, a streaming-write request requesting that write data corresponding to a target address which missed in a previous level of cache is written to cache data storage for the given level of cache without being allocated into the previous level of cache;
in response to the streaming-write request, generating a tagged-data prediction indicative of whether a target cache data entry of the cache data storage corresponding to the target address of the streaming-write request is predicted to be a tagged cache data entry that stores cached data associated with the target address and a valid memory safety check tag corresponding to the target address, or an untagged cache data entry that stores the cached data but does not store a valid memory safety check tag; and
selecting, based on the tagged-data prediction generated for the streaming-write request, how to schedule access to the cache data storage in response to the streaming-write request.

Further aspects, features and advantages of the present technique will be apparent from the following description of examples, which is to be read in conjunction with the accompanying drawings.

DESCRIPTION OF EXAMPLES

Figure 1:
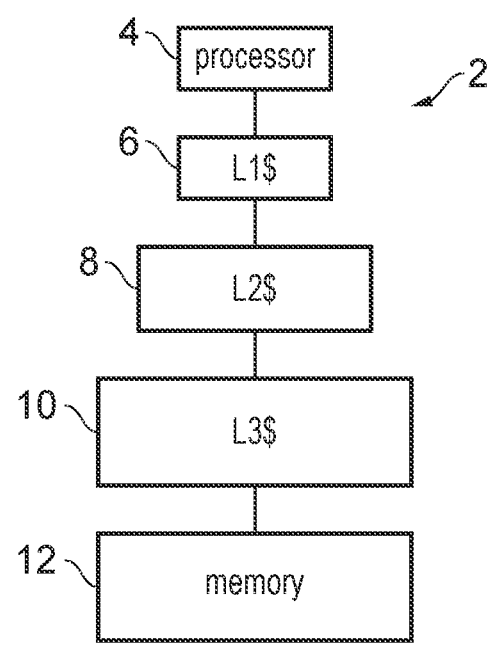
FIG. 1 illustrates an example of an apparatus having multiple levels of cache.

An apparatus has cache data storage to store data for a given level of cache, the cache data storage comprising a plurality of cache data entries.

One type of request that may be received at the given level of cache is a streaming-write request requesting that write data corresponding to a target address which missed in a previous level of cache is written to the cache data storage for the given level of cache without being allocated into the previous level of cache. Such streaming-write requests may typically request a write to a full cache line of data (without needing to read the cache line first). Streaming-write requests can be useful for processing workloads which write to a relatively large block of memory with relatively little likelihood of reusing any of the written data in the near future, since by avoiding the allocation in the previous level of cache for data unlikely to be needed soon, this avoids evicting other data from the previous level of cache that is more likely to be accessed sooner than the currently written data.

Some processor implementations may provide support for defining a memory safety check tag associated with a block of memory address space. The memory safety check tag can provide a check value enabling detection of memory safety errors (e.g. errors where, due to programming error and/or unexpected outcomes of program code, such as buffer overflow, an address pointer is used to cause access to a memory region that the address pointer was never intended to point to, risking corruption of data and increasing vulnerability to attack by a malicious party). The memory safety check tag value assigned to a given block of memory address space can be set by software, based on instructions of an instruction set architecture for setting such memory safety check tag values. When accessing a region of memory at a target address, a tag checking operation can be performed to compare the memory safety check tag associated with the accessed block of memory address space with an address tag assigned to an address pointer used to compute the target address, and an error handling response may be triggered if a mismatch between the memory safety check tag and the address tag is detected.

When data associated with a memory safety check tag is cached, it can be useful to hold the memory safety check tag associated with cached data in the same cache data entry of the cache data storage that holds the cached data itself. However, this introduces some extra complexity in scheduling access to the cache data storage for a streaming-write request. Given the nature of the workloads likely to use streaming-write requests, one would normally expect a streaming-write request to request overwriting of all bytes of cached data within a given cache line corresponding to the target address, so that it is not necessary to read the target cache data entry prior to writing as none of the previous cached data in the target cache data entry would be preserved following the streaming-write. However, when a memory safety check tag is held in the cached data entry alongside the cached data itself, that memory safety check tag might still need to be preserved as it cannot be deduced from the write data of the streaming-write request. Therefore, the way in which access to the cache data storage should be scheduled for a streaming-write request may depend on whether a valid memory safety check tag is present in the target cache data entry corresponding to the target address of the streaming-write request.

However, actually determining whether a given cache data entry is a tagged cache data entry or an untagged cache data entry may take some time, so for improved performance it may be desirable to schedule access to the cache data storage before the actual status of the target cache data entry for the streaming-write request is known. Hence, tagged-data prediction circuitry is provided to generate a tagged-data prediction in response to the streaming-write request. The tagged-data prediction is indicative of whether a target cache data entry corresponding to the target address of the streaming-write request is predicted to be a tagged cache data entry (that stores cached data associated with the target address and a valid memory safety check tag corresponding to the target address), or an untagged cache data entry (that stores the cached data but does not store a valid memory safety check tag). Cache access scheduling circuitry selects, based on the tagged-data prediction generated by the tagged-data prediction circuitry for the streaming-write request, how to schedule access to the cache data storage in response to the streaming-write request. With this approach, performance can be improved because the cache data access for the streaming-write request can be scheduled before the actual outcome of checking whether the target cache data entry is a tagged cache data entry is known, reducing delays in servicing the streaming-write request.

In some examples, the cache access schedule selected for the access to the cache data storage in response to the streaming-write request may vary depending on whether the target cache data entry is predicted to be a tagged cache data entry or an untagged cache data entry. Hence, rather than selecting a default scheduling method every time, the access schedule for the streaming-write request can be selected to be a first cache access schedule when the target cache data entry is predicted to be a tagged cache data entry and selected to be a second cache access schedule when the target cache data entry is predicted to be an untagged cache data entry. The inventors recognised that the portions of workloads which tend to use streaming-write requests also tend to have relatively infrequent transitions between accesses to regions of memory not having associated memory safety check tags and accesses to regions of memory having associated memory safety check tags, so whether one streaming-write request accesses a tagged cache data entry or untagged cache data entry can be highly correlated with whether a previous streaming-write request accesses a tagged cache data entry or untagged cache data entry. This means it is practical to implement a prediction scheme which, at relatively low circuit area cost, can make tagged-data predictions in which mispredictions of the tagged/untagged status of the target cache data entry can be infrequent enough that providing a variable tagged data prediction (not statically fixed to always predict the same outcome) depending on prediction state derived from outcomes for one or more previous streaming-write requests can improve average performance compared to approaches which either statically predict that the target cache data entry is a tagged cache data entry for every streaming-write request or statically predict that the target cache data entry is an untagged cache data entry for every streaming-write request.

In some examples, the cache access scheduling circuitry is configured to determine, based on the tagged-data prediction made by the tagged-data prediction circuitry for the streaming-write request, whether to schedule a read access to the target cache data entry in response to the streaming-write request. The read access may be useful if the target cache data entry is a tagged cache data entry, to allow the previously stored memory safety check tag to be preserved when handling the streaming-write request (some cache storage structures may not support writing to only a subset of bits of a cache data entry in a given write access, so if some of the previously stored data is to be preserved then a read-modify-write operation including a prior read access may be scheduled). The read access can be avoided (speeding up processing) if the streaming-write request targets an untagged cache data entry, in which case no memory safety check tag needs to be preserved and so a write access, without a prior read, is enough to overwrite all bytes of the cached data and set a memory safety check tag field of the target cache data entry to any arbitrary value (e.g. 0—the particular value written for the memory safety check tag would not matter if the memory safety check tag field is invalid). Hence, the prediction of whether the target cache data entry is tagged or untagged can be useful to decide whether to schedule the read access prior to the write access for the streaming-write request. If the prediction enables the read access to be omitted and the prediction turns out to be correct, this can improve performance by avoiding unnecessary cycles being consumed in performing the read.

In some examples, the cache access scheduling circuitry is configured to determine, based on the tagged-data prediction made by the tagged-data prediction circuitry for the streaming-write request, whether to schedule a full-line-write operation (which does not involve the prior read access, as it overwrites all bits of stored information in the target cache data entry) or a read-modify-write operation (which reads the previously stored information of the target cache data entry, modifies all or part of the read out information and then writes the modified data back to the target cache data entry). In response to the tagged-data prediction indicating that the target cache data entry is predicted to be an untagged cache data entry, the cache access scheduling circuitry may schedule the full-line write operation for the streaming-write request; and in response to the tagged-data prediction indicating that the target cache data entry is predicted to be a tagged cache data entry, the cache access scheduling circuitry may schedule the read-modify-write operation for the streaming-write request.

As well as the cache data storage, the given level of cache may also comprise cache tag storage comprising a plurality of cache tag entries each to store a cache tag value indicative of an address associated with cached data stored in a corresponding cache data entry of the cache data storage. Such cache tag values are separate from the address tags and memory safety check tags mentioned above. A cache tag is used on a lookup to the given level of cache to determine whether the cache data storage contains a cache data entry storing the cached data corresponding to a target address. The cache tag is derived from a portion of the target address which influences selection of the memory location in the memory system which holds the backing store copy of the data corresponding to the target address. In contrast, the memory safety check tag may be an arbitrary value assigned by software to a given block of memory for purpose in detecting memory usage errors, and is compared with an address tag associated with an address pointer. The address tag may in some implementations be derived from a portion of the address operand used to compute a target address of a memory access, where the portion of the address operand used to derive the address tag does not influence any of the bits of the target address that control selection of which memory location in the memory system holds the data corresponding to that target address.

Each cache tag entry of the cache tag storage may specify a tagged-entry identifier indicative of whether the corresponding cache data entry is a tagged cache data entry or an untagged cache data entry. Hence, the actual outcome of whether the target cache data entry is tagged or untagged may be resolved based on lookup of the cache tag storage in response to the streaming-write request. The tagged-entry identifier may identify whether the corresponding memory safety check tag field in the corresponding cache data entry is valid or invalid. However, as the cache tag storage lookup may take some time, it can be useful to speculatively schedule access to the cache data storage for the streaming-write request based on the tagged-data prediction, so that the cache access for the streaming-write can start earlier than if the cache access scheduling circuitry waited for the actual cache tag storage lookup before deciding whether to schedule a read access for the streaming-write.

In some examples, in response to a determination (e.g. based on the tagged-entry identifier in the cache tag storage) that the tagged-data prediction incorrectly predicted the target cache data entry as being an untagged cache data entry when the target cache data entry is actually a tagged cache data entry, the cache access scheduling circuitry may cancel an access to the cache data storage previously scheduled for the streaming-write request based on the tagged-data prediction, and reschedule the streaming-write request based on the target cache data entry being a tagged cache data entry. By the time the tag array is accessed and it is determined that the tagged-data prediction incorrectly predicted no read access was required when a read access is actually required, it may be too late to schedule the read access while allowing the streaming-write to continue without cancellation. Cancelling the streaming-write and replying it later based on a correct (e.g. read-modify-write access) schedule may incur a performance penalty, but such penalties can be infrequent given a reasonable prediction accuracy. Overall processing performance can be improved by supporting the prediction as, even considering occasional mispredictions, the prediction reduces the need to incur the extra latency of a read access when actually the target cache data entry is untagged.

In the opposite misprediction scenario, when the tagged-data prediction incorrectly predicted the target cache data entry as being a tagged cache data entry and the target cache data entry is actually an untagged cache data entry, it is not necessary to cancel the access to the cache data storage scheduled for the streaming-write request. While a read-modify-write access already scheduled for the streaming-write request may be unnecessary when it is resolved that the target cache data entry is actually untagged, by the time the actual status of the cache data entry is resolved it may be faster to allow the read-modify-write access to continue than to cancel the streaming-write request and replay it later as a full-line write.

In some examples, the tagged-data prediction circuitry is configured to generate the tagged-data prediction based on tagged-data prediction state maintained based on whether one or more previous streaming-write requests were determined to require access to a tagged cache data entry or an untagged cache data entry. Dynamically varying predictions of whether the target cache data entry stores a valid memory safety check tag, based on state maintained from observation of behaviour of previous requests, can provide a reasonably high prediction accuracy and enables the prediction to be tailored to the behaviour of the particular workload being executed. This improves performance compared to approaches which statically predict always-tagged or always-untagged.

The tagged-data prediction state could be maintained in various ways.

In one example, the tagged-data prediction state may be indicative of whether a most recent streaming-write request was determined to require access to a tagged cache data entry or an untagged cache data entry. Streaming-write requests tend to be used for write accesses to relatively long blocks of memory all assigned for a same purpose, so in the absence of coding errors it is much more likely that the memory address space accessed in a given burst of streaming-write requests is either all tagged or all untagged. Transitions between tagged memory and untagged memory within a run of streaming-write requests may be very infrequent. Therefore, a simple predictor of whether a given streaming-write request will target a tagged/untagged cache data entry can be to maintain an indication of whether the most recent streaming-write request required access to a tagged/untagged cache data entry, and predict the given streaming-write request as having the same outcome as the most recent streaming-write request.

Other examples could provide tagged-data prediction circuitry which generates the tagged-data prediction based on a frequency-tracking indicator indicative of a relative frequency of previous streaming-write requests that required access to a tagged cache data entry. For example, the frequency-tracking indicator could indicate (precisely or imprecisely) a ratio of streaming-write requests that required access to a tagged cache data entry to streaming-write requests that required access to an untagged cache data entry within a most recent block of streaming-write requests, which can be used to deduce the likelihood of a subsequent request requiring access to a tagged/untagged cache data entry. This could help improve performance for workloads for which, although the majority of a run of streaming-write requests target untagged/tagged cache data entries, occasionally there is a single streaming-write request in the middle of the run which has the opposite behaviour.

In some examples, the tagged-data prediction circuitry is configured to generate the tagged-data prediction based on a counter. A counter can be a relatively circuit-area-efficient technique for providing state tracking behaviour of previous streaming-write requests, for use in making the tagged-data prediction for subsequent streaming-write requests. The tagged-data prediction circuitry can adjust the counter in a first direction, in response to detecting a streaming-write request that requires access to an untagged cache data entry. The tagged-data prediction circuitry can adjust the counter in a second direction opposite to the first direction, in response to detecting a streaming-write request that requires access to a tagged cache data entry. The counter can be a saturating counter, so once the counter reaches a minimum/maximum value in one of the first/second direction, a further update in that direction does not cause the counter to roll over to the maximum/minimum value in the other of the first/second direction.

The counter could be a 1-bit counter. Use of a 1-bit saturating counter may be helpful for providing a prediction based on whether the most recent streaming-write request targeted a tagged/untagged cache data entry.

The counter could be a multi-bit counter. This can provide a representation of the relative fraction of streaming-write requests that target tagged or untagged cache data entries within a recent group of streaming-write requests.

In some examples, the tagged-data prediction state used to make the tagged-data prediction could be global tagged-data prediction state looked up independent of the target address of the streaming-write request. Hence, it is not necessary to maintain separate prediction state indicators corresponding to particular addresses or groups of addresses. A single item of stored prediction state shared between all streaming-writes regardless of which address is the target address can provide sufficient prediction success rates to improve performance relative to static predictions of always-tagged or always-untagged.

In other examples, the tagged-data prediction state comprises local tagged-data prediction state specific to a subset of addresses, the tagged-data prediction state being looked up dependent on the target address of the streaming-write request. For example, the target address of the streaming-write request can be used to look up a prediction cache structure to obtain the item of tagged-data prediction state corresponding to the target address. Each item of tagged-data prediction state could, for example, comprise a 1-bit or multi-bit counter as in the examples above, or any other indication of the relative frequency, among streaming-write requests having addresses in the corresponding subset of addresses that correspond to that item of tagged-data prediction state, of streaming-write requests requiring access to tagged/untagged cache data entries. Hence, when updating the tagged-data prediction state based on the actual outcome of whether a streaming-write request targeted a tagged/untagged cache data entry, the tagged-data prediction circuitry can select which item of tagged-data prediction state is to be updated, based on the target address of the streaming-write request for which the actual tagged/untagged outcome was resolved.

In some examples, the apparatus may also comprise write streaming control circuitry to determine, in response to a given write request for the target address missing in the previous level of cache, whether to issue a linefill request or the streaming-write request to the given level of cache in response to the miss for the given write request. A linefill request comprises a request to obtain data corresponding to the target address from the given level of cache and allocate the obtained data into the previous level of cache. For example, the write streaming control circuitry may determine whether to issue the linefill request or the streaming-write request in response to the miss for the given write request, based on analysis of previous data access patterns. For example, the write streaming control circuitry may support a write streaming mode (in which the streaming-write request is issued in response to the given write request missing in the previous level of cache) and a non-write-streaming mode (in which the linefill request is issued in response to the given write request missing in the previous level of cache). Selection of whether to operate in the streaming-write mode or the non-write-streaming mode may be controlled based on the previous data access patterns observed for a current processing workload. For some "non-streaming" workloads, linefills into the previous level of cache may be more beneficial (e.g. when making data access patterns where subsequent reuse of data written to the cache is reasonably likely within a relatively short time frame), and for other "streaming" workloads such linefills may not be beneficial and streaming-writes to write the write data into a subsequent level of cache without allocation into the previous level of cache may be preferred. By monitoring access patterns to detect which mode is preferred, processing performance can be improved by reducing the likelihood that a streaming workload trashes the previous level of cache when future reuse of the data accessed by the streaming workload in the near future is unlikely.

In some examples, the write streaming control circuitry may switch to the write streaming mode in response to detecting more than a threshold number of consecutive linefill requests that are full-line linefill requests. Here, a full-line linefill request may comprise a linefill request for which, by the time that linefill request completes, one or more write requests have already been detected that collectively cover all bytes of a cache line corresponding to an address specified by the linefill request. This does not necessarily require a single write request to the previous level of cache to write to all bytes of a cache line in one go. Some caches may provide a linefill buffer, and if one write request targeting part of a cache line misses in the previous level of cache and is awaiting return of linefill data following a linefill request being sent to a subsequent level of cache, and another write request is detected targeting another part of that same cache line, the write data of those requests may be merged in the linefill buffer. Hence, even if the initial write request that triggered the linefill request did not fully write to all bytes of the targeted cache line, by the time a linefill request completes other requests may have requested writes to other bytes of the targeted cache line and so the linefill request may now be full-line linefill request if every byte of the cache line is written. If there are a number of consecutive linefill requests which are all full-line linefill requests, this is a hint that a workload is executing which is writing to a large block of contiguous data in memory with relatively little probability of future reuse of that data in the near future. For example, the workload could be a "memset" type workload which is clearing a block of memory address space to a predetermined value such as zero. Hence, the write streaming control circuitry may switch to the write streaming mode if more than a threshold number of consecutive linefill requests are detected to be full-line linefill requests, to reduce likelihood of a streaming workload evicting more useful data from the previous level of cache and filling that cache will data unlikely to be accessed again soon. The threshold number can be configurable or could be a fixed value (e.g. hardwired).

On the other hand, in response to detecting a streaming-mode cancellation event, the write streaming control circuitry may switch to the non-write-streaming mode. The streaming-mode cancellation event could, for example, be detecting a cache write operation for which only part of a cache line is written and/or detecting a read request to an address of a cache line for which an in-flight write request is still being processed. These events tend to indicate that the burst of writes to a block of address space unlikely to be read in the near future has ended, and so it may be more beneficial to performance if subsequent write requests which miss in the previous level of cache trigger an allocation into the previous level of cache rather than skipping allocation into the previous level of cache, as those subsequent write request are more likely to be writing data which will be accessed soon by read requests. Also, the streaming-mode cancellation event could comprise detecting that a linefill buffer occupancy reaches or exceeds a threshold number of linefill requests. If a linefill buffer is getting full, there may not be enough spare linefill buffer capacity to hold linefill requests in the linefill buffer until there are enough writes to the target cache line to fully cover all bytes in the cache line, so it may be preferred to action a linefill request before all bytes are covered, so that it cannot be processed as a streaming-write anymore.

In some examples, the apparatus may comprise tag checking circuitry to perform a tag checking operation in response to a tag-checking memory access operation specifying a given address operand for deriving a given target address. The tag checking operation comprises comparing a given address tag derived from the given address operand with a given memory safety check tag stored in a memory system in association with a block of one or more memory locations comprising an addressed location identified by the given target address, and in response to a mismatch being detected between the given address tag and the given memory safety check tag, performing a memory safety error handling response. For example, the memory safety check tag used for the tag checking operation could be the memory safety check tag accessed from the cache data entry of the given level of cache, or could be obtained from elsewhere (e.g. from another level of cache, or from memory, if there is no hit in the given level of cache). A mismatch can be detected between the given address tag and the given memory safety check tag if the value of the given address tag is different to the value of the given memory safety check tag and there is no other reason to consider the given address tag to match the given memory safety check tag (e.g. some implementations may support the ability to set a "match all" value for one of the address tag and memory safety check tag which is considered to match against any possible value of the other of the address tag and memory safety check tag). By providing such tag checking circuitry, this can provide support for hardware-controlled detection of memory safety errors which are common in program code but can cause functional errors and/or vulnerability to attack.

The memory safety error handling response can be of various types. In some examples, the memory safety error handling response comprises signalling a fault. The tag-checking memory access operation may be rejected. The fault may trigger an exception handler to examine the cause of the fault and determine how to proceed. Alternatively, some approaches may not necessarily prevent the tag-checking memory access operation being successful if the tag check fails, but may update an error record to record that the tag mismatch was detected. For example, the error record could be bits in a control register set to indicate the occurrence of tag mismatch errors, and/or an error log maintained in a buffer structure in memory to record information about the memory access operation that encountered the tag mismatch. An error log may be reported to a software developer to prompt the software developer to review the errors and patch up any memory usage errors if necessary. Hence, it is not essential for a tag check error to cause the corresponding memory access to be halted.

Specific examples are now described with reference to the drawings.

FIG. 1 illustrates an example of an apparatus 2 in which the techniques described above can be applied. The apparatus 2 may be a data processing system, for example. The apparatus 2 comprises a processor 4 which has access to a memory system. For example, the processor 4 may comprise a central processing unit (CPU), graphics processing unit (GPU), neural processing unit (NPU—a specialized kind of processor for accelerating machine learning workloads), or any other processing element capable of executing instructions to carry out data processing with reference to data stored in a memory system. The memory system in this example comprises three levels of cache, namely a level 1 cache 6, level 2 cache 8 and level 3 cache 10, and main memory 12. It will be appreciated that more or fewer levels of cache could be provided in some examples. The level 1 cache 6 is the cache closest to the processor 4 which is fastest to access for the processor 4. If a lookup for a required memory access misses in the level 1 cache 6, a further lookup may be performed in a subsequent level of cache, e.g. the level 2 cache 8 or level 3 cache 10, and if that lookup hits then the data access request may be serviced faster than if the lookup misses in all levels of cache and data has to be obtained from memory 12. While FIG. 1 shows a single processor 4 for conciseness, it will be appreciated that other examples could have more than one processor 4 sharing access to memory 12. Some levels of cache (e.g. the level 1 and level 2 caches 6, 8) may be private to a particular processor 4 while other levels of cache (e.g. the level 3 cache 10) could be shared between multiple processors 4.

In some examples, the apparatus 2 may comprise a system-on-chip implemented on a single integrated circuit. However, in other examples the apparatus 2 may comprise a number of chiplets, e.g. connected via an interposer, with some of the functionality of the apparatus 2 implemented on one chiplet and other functionality implemented on a separate chiplet. For example, the level 2 cache 8 functionality could be on a separate chiplet from the level 1 cache 6 and/or the portions of the processor 4. Different chiplets could be manufactured/sold separately as separate products, and could be manufactured/sold by different parties under separate licenses. Therefore, while the overall system 2 is described for ease of understanding, in some examples sub-components of the system could be provided as separate standalone products, without needing a given instance of the apparatus to encompass all of the components shown in FIG. 1.

Figure 2:
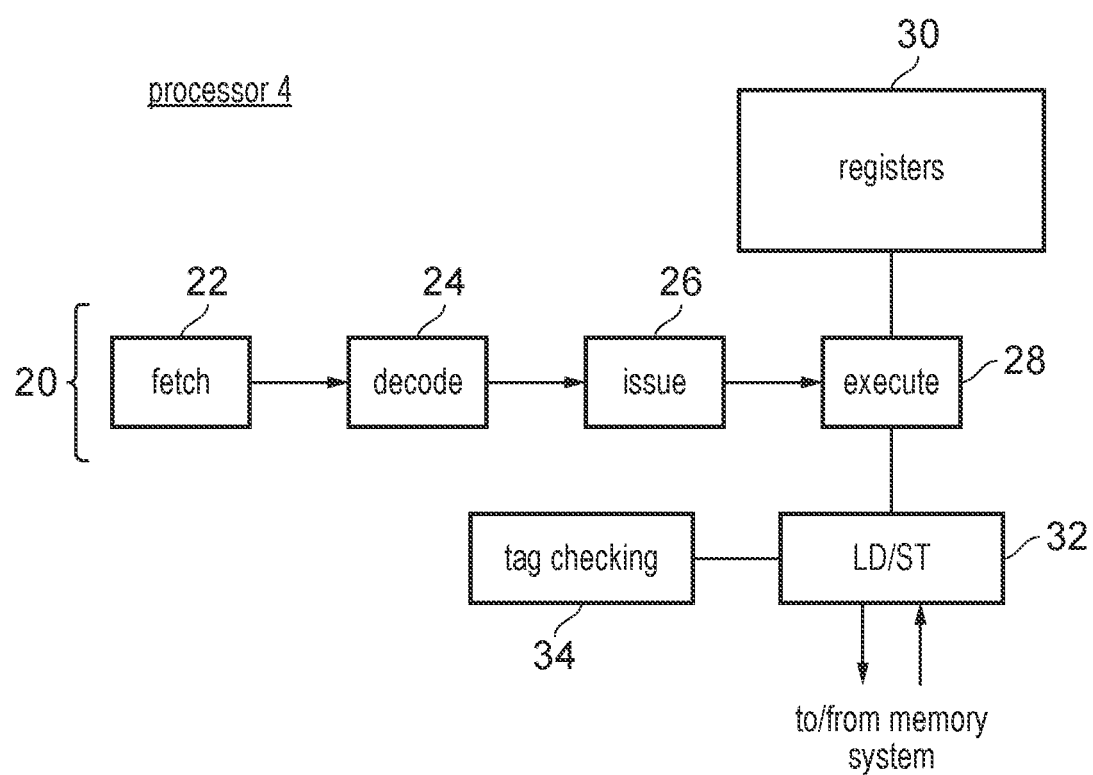
FIG. 2 illustrates an example of a processor having tag checking circuitry.

FIG. 2 shows an example of the processor 4. The processor 4 comprises a processing pipeline 20 comprising a number of pipeline stages for performing various functions in relation to program instructions of a processing workload being executed. In this example, the pipeline stages include a fetch stage 22 for fetching instructions from an instruction cache or memory 12 (the instruction cache could be a dedicated level 1 instruction cache separate from the level 1 data cache 6 shown in FIG. 1 for servicing load/store operations, or could be shared with data caches, e.g. the level 2 cache 8 and any subsequent level of cache 10 may be shared between data accesses and instruction fetches). The pipeline stages also include a decode stage 24 for decoding the fetched program instructions to generate micro-operations (decoded instructions) to be processed by remaining stages of the pipeline; an issue stage 26 for checking whether operands required for the micro-operations are available in a register file 30 and issuing micro-operations for execution once the required operands for a given micro-operation are available; and an execute stage 28 for executing data processing operations corresponding to the micro-operations, by processing operands read from the register file 30 to generate result values. The result values may be written back to the register file 30. It will be appreciated that this is merely one example of possible pipeline configuration, and other systems may have additional stages or a different configuration of stages. For example in an out-of-order processor a register renaming stage could be included for mapping architectural registers specified by program instructions or micro-operations to physical register specifiers identifying physical registers in the register file 30. In some examples, there may be a one-to-one relationship between program instructions decoded by the decode stage 24 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 28 may include various execution units for carrying out processing operations for various classes of program instructions. For example, the execution units may include one or more scalar arithmetic/logic units (ALUs) for executing scalar arithmetic/logical instructions, one or more vector units for executing vector instructions, or a branch unit to execute branch instructions.

One particular execute unit associated with the execute stage 28 may be a load/store unit 32 for executing load/store operations in response to load/store instructions. The load/store unit 32 may issue access requests to the memory system (caches 6, 8, 10 and memory 12) and handle responses received from the memory system. For example, in response to a load instruction specifying at least one destination register, the load/store unit 32 may issue a read request to the memory system to request that read data, which is read from one or more locations in the memory system corresponding to a target address identified based on at least one address operand of the load instruction, is returned from the memory system and written to the at least one destination register. In response to a store instruction specifying at least one source register, the load/store unit 32 may issue a write request to the memory system to request that write data, which is obtained from the at least one source register, is written to locations in the memory system corresponding to a target address identified based on at least one address operand of the store instruction.

The processor 4 in the example of FIG. 2 has tag checking circuitry 34 for supporting tag checking operations being performed for memory access operations carried out by the load/store unit 32 of the processor 4. Such tag checking operations can be useful for detecting memory safety errors.

Software to be executed by a data processing apparatus may typically be written in a high-level programing language and then compiled into code according to the instruction set architecture supported by the apparatus on which the software is to be executed. For example, the software may originally be written in a higher level language such as Java, C or C++, and then compiled into a natively supported instruction set architecture such as x86 or Arm®.

Some higher level programming languages, such as Java, are considered memory-safe languages because they include run time error detection checks for checking for certain errors relating to memory accesses. In contrast, memory-unsafe languages, such as C and C++, do not include such run time error checks. The enduring prevalence of use of memory-unsafe languages means that in compiled code according to a given instruction set architecture, there may be a large number of memory related errors which may be vulnerable to exploitation by an attacker or other malicious party. Such errors may include:

Bounds violations, in which an array index supplied by the code is outside the legitimate bounds of the array;

Use-after-free errors, in which an access to a memory location is made after that memory location has already be deallocated or freed;

Use-after-return, in which a memory access to an address associated with a variable used within a function (such as a value on a stack) is made after already returning from the function;

Use-out-of-scope errors, in which variables are accessed outside of the scope in which they are declared; and Use-before-initialisation errors, in which a memory address associated with a variable is accessed before the variable has been initialised.

These are just some examples of memory-related errors which can result in unpredictable behaviour and potentially provide avenues for attackers to exploit. Hence, it may be desirable to provide architectural support, within the instruction set architecture supported by a given processing apparatus, for assisting with runtime detection of certain classes of memory safety errors.

One approach for protecting against certain memory usage errors of the type discussed above may be to provide memory safety check tags which are stored in a memory system in association with blocks of one or more memory locations. When a tag-checking memory access operation is requested based on a target address identifying a particular addressed location in the memory system, memory access circuitry may compare an address tag that is associated with the target address (more particularly, an address tag associated with the address operand used to compute the target address) with a memory safety check tag that is stored in the memory system in association with a block of one or more memory locations which includes the addressed location identified by the target address. The memory access circuitry may generate an indication of whether a match is detected between the memory safety check tag and the address tag. This indication can be used to control whether the memory access is allowed to succeed or whether subsequent operations can succeed, or could merely be reported (e.g. in an error log or by setting an indication in a register) while allowing memory accesses to continue as normal. The memory safety check tag can also be referred to as a "guard tag", "memory colouring tag" or "allocation tag".

Such tag checking can be useful as, for example, a compiler compiling code based on a memory-unsafe language such as C or C++ can, when initialising regions of memory, set the memory safety check tags of blocks of memory which the code is expected to access to particular values, and may associate the corresponding address tag values with the target addresses pointing to those blocks. Different memory safety check tag values may be assigned to neighbouring memory regions which are intended for different purposes, so that if an address pointer intended for accessing for one of those regions is accidentally set to a value that causes it to cause access to another region, the error can be detected based on the tag mismatch. Hence, if a memory usage error occurs, and for example the address pointer is used out of scope or extends out of the bounds of the valid range which was initialised, then it may be likely that the memory safety check tag associated with the addressed location may not match the address tag associated with the target address, and then in this case the indication of whether a match is detected can be used to trigger an error handling response or error reporting mechanism. The particular response taken can depend on the particular needs of the software being executed or on the particular micro-architectural implementation of the architecture. Hence, even if the high level language does not have means for performing run time error checks in order to guard against memory access errors, the ISA used for the compiled code may include architectural features for performing such checks.

Figure 3:
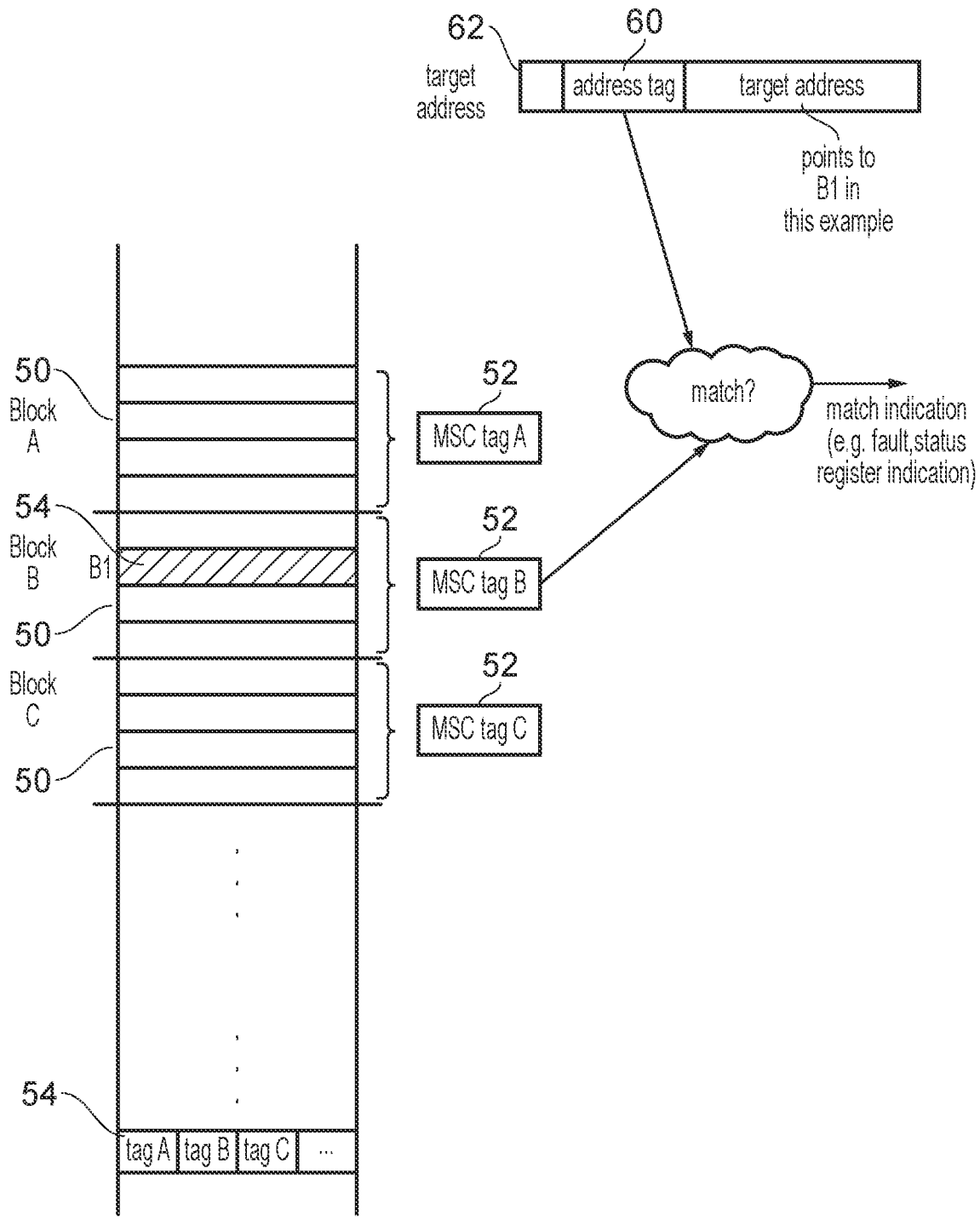
FIG. 3 schematically illustrates an example of a tag checking operation.

FIG. 3 schematically illustrates a concept of a tag checking operation performed by the tag checking circuitry 34 in response to a tag-checking memory access. The physical address space used to refer to memory locations within the memory system may be logically partitioned into a number of blocks 50 each comprising a certain number of addressable locations. For conciseness, in the example of FIG. 3, each block 50 comprises four memory locations, but other block sizes could be used as well. Each block 50 is associated with a corresponding memory safety check (MSC) tag 52. The MSC tags 52 associated with a certain number of blocks 50 can be gathered together and stored either within a different architecturally accessible memory location within the physical address space, or within additional storage locations provided in tag storage which is not architecturally accessible (not mapped to the same physical address space). A dedicated tag cache could be provided in the micro architecture for caching tag values from the non-architecturally accessible storage, for faster access than if the tags had to be accessed from main memory 12, or alternatively for some caches (such as the level 2 cache 8 discussed in more detail below), the MSC tags 52 can be held alongside the corresponding cached data within cache data storage. Hence, there is flexibility to implement the storage of the MSC tags 52 in a wide variety of ways, but in general each block 50 of memory address space is capable of being associated with a corresponding MSC tag value 52. The particular numeric value assigned to a given MSC tag for a given block 50 of address space is arbitrary (e.g. selected by software) and can be controlled based on execution of tag setting instructions supported in the instruction set architecture (ISA) supported by the processor 4. Similarly, instructions for setting an address tag for a given address pointer operand may be supported in the ISA.

Hence, when a tag-checking memory access is required, an address tag 60 (which is associated with the target address 62 identifying the addressed location to be accessed), is compared against the MSC tag 52 which is associated with the block of memory locations 50 which includes the addressed location. For example, in FIG. 3 the target address 62 points to a certain location B1 in memory, marked 54 in FIG. 3. Therefore the MSC tag B which is associated with the block of locations B including location B1 is compared against the address tag 60 associated with the target address 62. As shown at the top of FIG. 3, the address tag 60 may be determined as a function of selected bits of the target address itself. In particular, the address tag may be determined from bits within a portion of the address operand used to compute the target address, where that portion is unused for indicating the specific memory location which is to be selected as the addressed location 54. For example, in some architectures the top portion of bits of the target address may always have a certain fixed value such as a sign extension (all 0s or all 1s) and so an address can be tagged with the address tag 40 by overwriting these unused bits with an arbitrary tag value. The particular address tag value can be selected by a programmer or compiler for example. The address tag 60 and MSC tag 52 can be a relatively small number of bits, e.g. 4 bits, and so need not occupy much space within the memory and within the target address. Providing 4 bits of tag space, i.e. 16 possible values of the tags, can often be enough to detect many common types of memory access errors.

Hence, when a tag-checking memory access is performed, the tag checking circuitry 34 compares the address tag 60 obtained from the address operand from the MSC tag 52 associated with a block 50 of address space including the addressed location 54 corresponding to the target address, and determines whether they match. The tag checking circuitry 34 generates a match indication indicating whether the address tag 60 and the MSC tag 52 matched. For example, this match indication could be a fault signal which is generated if there is a mismatch between the address tag 60 and the MSC tag 52, or an indication placed in a status register indicating whether there was a tag match, or an entry added to an error report to indicate the address for which the error was detected and/or the instruction address of the instruction which triggered the error. The particular form of the generated indication of whether a match is detected between the memory safety check tag and the address tag may vary from implementation to implementation.

In some cases, the tag checking operation may comprise controlling whether a memory access to the addressed location is allowed depending on whether the match is detected between the memory safety check tag and the address tag.

However, in other examples the tag-checking memory access may comprise performing a memory access to the addressed location irrespective of whether a match is detected between the MSC tag and the address tag. For example, in some cases the MSC tag associated with a given block of memory locations may be stored in a different block of memory locations within the memory system and so (if the MSC tag is not already available in a cache), accessing the memory safety check tag may sometimes require a separate read operation to memory. Therefore, it may delay processing of the actual memory access if the memory access is delayed until the memory safety check tag and the address tag have been compared, so it may be desired to perform the memory access to the addressed location before the memory safety check tag is available, and then check the memory safety check tag later once available.

In one example the indication of whether a match is detected may be a signal representing a fault condition, which is generated when a mismatch is detected between the memory safety check tag and the address tag. For example, the memory access circuitry may signal a similar memory fault to faults generated if access permissions are violated or unmapped addresses are accessed, or a different kind of fault condition could be indicated. The fault signal could trigger the processing circuitry to execute an exception handling routine for responding to the detected fault, and can prevent the memory access being successful (or if the tag mismatch is not detected until sometime after the memory access has been initiated, blocks program code from progressing beyond the point when the tag mismatch is detected).

Alternatively, a status indication may be recorded within a control register accessible to the processing circuitry of the apparatus, to indicate whether a match or mismatch was detected in the comparison of the memory safety check tag and the address tag. The status information could then be read by subsequent instructions to check whether the memory access was valid.

Another option for reporting whether the address tag and memory safety check tag matched or mismatched can be to record information in an error log associated with the executed piece of code, which tracks any memory safety check tag errors detected throughout the piece of code. For example, in response to a mismatching memory safety check tag and address tag, the target address which triggered the mismatch, or the instruction address of the instruction which triggered the mismatching memory access, could be recorded in the error log, which may be stored in memory 12 for example. In this case, rather than performing any specific action to impede the operation of the code, the errors could simply be recorded in the error log. The error log could then be made available to a software provider of the code to assist the provider with reviewing the code for errors and identifying areas of development for eliminating errors in subsequent versions of the software.

Hence, it will be appreciated that there are a range of ways in which the memory safety check tag match/mismatch indication could be generated by the memory access circuitry (and hence a range of possible error handling responses that could be taken).

In some examples, the blocks of memory locations which have corresponding memory safety check tags may each comprise a single memory location. In this case, each individual memory location may have a different memory safety check tag, which can provide fine granularity of setting the memory safety check tags so that a greater range of memory errors can be detected.

However, in practice the overhead of setting individual memory safety check tags for each addressed location may be too high, and it can be more efficient to associate each memory safety check tag with a block of multiple memory locations. In this case several adjacent memory locations may share the same memory safety check tag, which can be enough for detecting common forms of memory-related error.

The address tag can be associated with the target address in different ways. In some cases the address tag could be specified separately from the target address, e.g. using a separate register specified by a tag-checking memory access instruction which triggers the tag-checking memory access operation. However, in other examples (as shown in FIG. 3) the address tag may be determined as a function of one or more selected bits of the target address. That is, the address tag may comprise information derived from a portion of the target address itself. Often, while an instruction set architecture may support addresses with a certain number of address bits (e.g. 64 bits), a given hardware device may not in practice need so much memory capacity that it would use all the possible addresses which can be represented using that number of address bits. For example, with current trends in device usage there is not yet any need to provide 264 individual addressable locations. Therefore, often some bits of the memory addresses may effectively be unused and may either always have the same value, or be set as a sign extension of the most significant "real" address bit (so that the unused portion is set to all 0s or all 1s). This unused portion can therefore be reused to represent the address tag or a value for deriving the address tag, to avoid needing to access a separate register in order to obtain the address tag, and also to make it easier to track the correspondence between the addresses and the corresponding address tags as the address tag may by definition be transported along with the address whenever the address is manipulated or moves between registers.

In examples which use a portion of the target address to determine the address tag, note that this address tag is different to a tag portion of the target address which may be used by caches to derive a cache tag used to determine whether the information associated with the target address is stored within the cache. Many caching schemes may store a tag portion of the address of a cached piece of data alongside that data within the cache, so that on searching the cache for a given address, part of the address can be compared with the cache tags stored alongside the cached data in order to determine whether the cached data actually corresponds to the required address. However, in this case the tag portion of the address, which is compared with the tag stored in the cache would be derived from part of the portion of the address which actually identifies the particular addressed location for which the data is required, i.e. changing the cache tag portion of an address would by definition result in the address pointing to a different addressed location within the memory system. In contrast, with the address tag 60 used for the tag-checking memory operation, the memory access circuitry may select the addressed location 54 for which data is required independent of the address tag 60. That is, even if the address tag 60 within the address operand has different values, the addressed location 54 referenced by the target address may still be the same as the selection of the addressed location depends only on other portions of the target address. This gives the freedom for compilers to set the address tags associated with particular addresses to any value to match the corresponding memory safety check tag values which have been allocated to the relevant blocks of data in the memory system.

In some implementations, the instruction decoder could support separate non-tag-checking and tag-checking variants of memory access instructions. In this case, the tag-checking memory access operation could be triggered in response to the tag-checking variant of the memory access instruction. In contrast non-tag-checking memory access instructions could simply trigger an access to the addressed location identified by the target address specified by that instruction, without needing to obtain a memory safety check tag or perform any comparison between the address tag and the memory safety check tag.

However, in other implementations all memory accesses may be considered to be tag-checking memory accesses. Hence, in some cases any memory access instruction may be considered to trigger the memory access circuitry to perform a tag-checking memory access operation as discussed above.

However, even if all memory access instructions are interpreted as tag-checking memory access instructions, there may still be other ways in which the instruction set architecture may support selectively disabling the memory safety check tag comparison for certain operations. For example, a control parameter within a control register of the processing apparatus could selectively disable tag comparisons.

Another option is for a certain value of the address tag or MSC tag to be interpreted as a "match all" value so that the "match all" tag value is considered to match against any possible value of the opposite tag, again effectively disabling the effects of the tag comparison so that no error is reported regardless of whether the address tag matches the memory safety check tag. Hence, in some cases the comparison in the tag check may be detecting whether there is a mismatch between the MSC tag 52 and address tag 60, but not all cases where the values of the MSC/address tags 52, 60 differ need to be detected as mismatches which trigger an error handling response, since if one or both of the MSC tag 52 and address tag 60 is a "match all" tag then no error handling response needs to be triggered.

Figure 4:
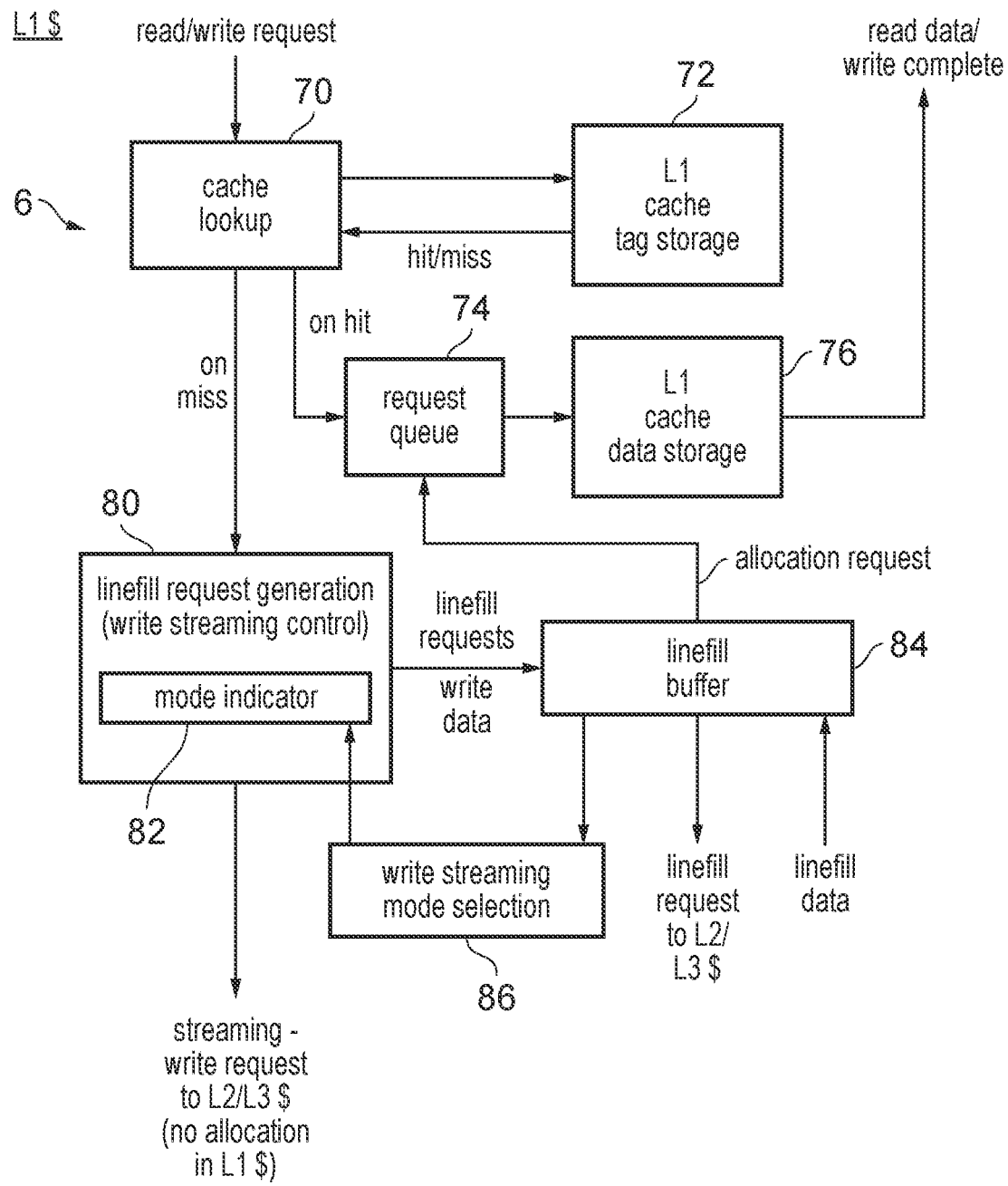
FIG. 4 illustrates an example of a level 1 cache having write streaming control circuitry.

FIG. 4 illustrates an example of circuitry provided at the level 1 data cache (L1 cache) 6. The L1 cache 6 has cache lookup circuitry 70 for controlling lookups of the L1 cache 6 in response to a read or write request received from the processor 4. The L1 cache 6 has L1 cache tag storage 72 for storing cache tags corresponding to cache data entries in L1 cache data storage 76. The stored cache tag for a given cache data entry is an indication of the address of the data stored in that cache data entry.

In response to a given read or write request specifying a target address of read data to be read or write data to be written, the cache lookup circuitry 70 looks up a set of cache tag entries in the L1 cache tag storage 72 selected based on the target address. The cache lookup circuitry 70 compares a cache tag value derived from the target address to cache tags stored in each of the looked up set of cache tag entries, and if any of the looked up cache tags match the cache tag for the target address, a cache hit is detected and a corresponding read/write request is issued to a request queue 74 to await processing by the L1 cache data storage 76. When the corresponding read/write request is selected for servicing by the L1 cache data storage 76, the target cache data entry of the L1 cache data storage 76 (i.e. the cache data entry that corresponds to the cache tag entry of the cache tag storage 72 that contained the matching tag) is read or written, and either read data is returned to the processor 4 in response to a read request or a write completion indication is returned to the processor 4 in response to a write request.

However, if none of the looked up cache tags obtained from the corresponding set of cache tag entries of the L1 cache tag storage 72 matches the cache tag derived from the target address of the read/write request, then a cache miss is detected for the L1 cache 6. Linefill request generation circuitry 80 allocates an entry in a linefill buffer 84 for the cache line associated with the read/write request which missed, and if the request is a read or a write operation which does not write to all bytes of a cache line, issues a linefill request to a subsequent level of cache (e.g. level 2 cache (L2 cache) 8 or level 3 cache (L3 cache) 10). On return of linefill data in response to the linefill request, the linefill data is allocated into the linefill buffer. When all bytes of a cache line subject to a linefill are available (either from write data of one or more pending write requests, or from linefill data returned from the subsequent level of cache 8, 10 or from memory 12), a cache allocation request is forwarded to the request queue 74 to await servicing by the L1 cache data storage 76 and L1 cache tag storage 72. Processing of the allocation request may involve steps of selecting a victim cache data entry to be allocated with the data for the target address and evicting data from the victim entry before writing the linefill data into the cache. As well as allocating the linefill data into the L1 cache, for a read request the data returned for the linefill request may also be returned to the processor 4 in response to the read request which triggered the linefill. Also, any victim data evicted from the victim entry may be written back to a subsequent level of cache or to main memory, if the victim data is valid and dirty.

For a write request which misses in the L1 cache 6, the write request can be handled in one of two modes: a non-write-streaming mode and a write-streaming mode. The linefill request generation circuitry 80 also functions as write streaming control circuitry for selecting how to handle the missing write request, based on a mode indicator 82 which indicates whether the current mode is the non-write-streaming mode or the write-streaming mode. Write streaming mode selection circuitry 86 switches the current mode between the non-write-streaming mode and the write-streaming mode based on analysis of access patterns of linefill requests processed by the linefill buffer 84, in particular based on whether, by the time a given linefill completes for write operations, a burst of writes fully covering each byte of the corresponding cache line has been detected. If more than N (where N is a threshold number that may be fixed or configurable) successive linefill operations are full-line writes for which every byte of the corresponding cache line is overwritten by write data from one or more write requests received from the processor 4, then the current mode is switched to the write streaming mode. If a load (read request) is detected to a cache line having an outstanding write-triggered linefill request still pending in the linefill buffer 84, or if a write-triggered linefill is detected which by the time it is completed has not fully overwritten every byte of the corresponding cache line, then the write streaming mode is cancelled and the current mode switches back to the non-write-streaming mode.

In the non-write-streaming mode, a write request that misses in the L1 cache 6 triggers a corresponding linefill request to be allocated to the linefill buffer 84 and, once either a full line has been written by one or more write requests targeting that cache line, or the corresponding linefill data is returned from memory, a corresponding allocation request is generated to request allocation of an entry in the L1 cache data storage 76 for the target address of the write request. The write data associated with the write request is merged with any other data for the same cache line (e.g. written by other write requests to the cache line or linefill data obtained from a subsequent cache or memory), before the merged write data is written to the allocated cache entry of the L1 cache data storage 76 and the corresponding cache tag entry of the tag storage 72 is updated to reflect that the allocated cache data entry corresponds to the target address of the write.

In the write streaming mode, no attempt is made to allocate an entry in the L1 cache data storage 76 for the target address of the write which missed in the cache. Instead, a streaming-write request is issued to a subsequent level of cache (e.g. L2 cache 8 or L3 cache 10), to request that data is written into that level of cache 8, 10 without being allocated in the L1 cache 6. The particular level of cache to which the streaming-write request is directed could be fixed (e.g. streaming-writes could always be sent to the L2 cache 8) or could be variable, e.g. based on a configuration input or based on a heuristic detected based on monitoring access patterns.

Figure 5:
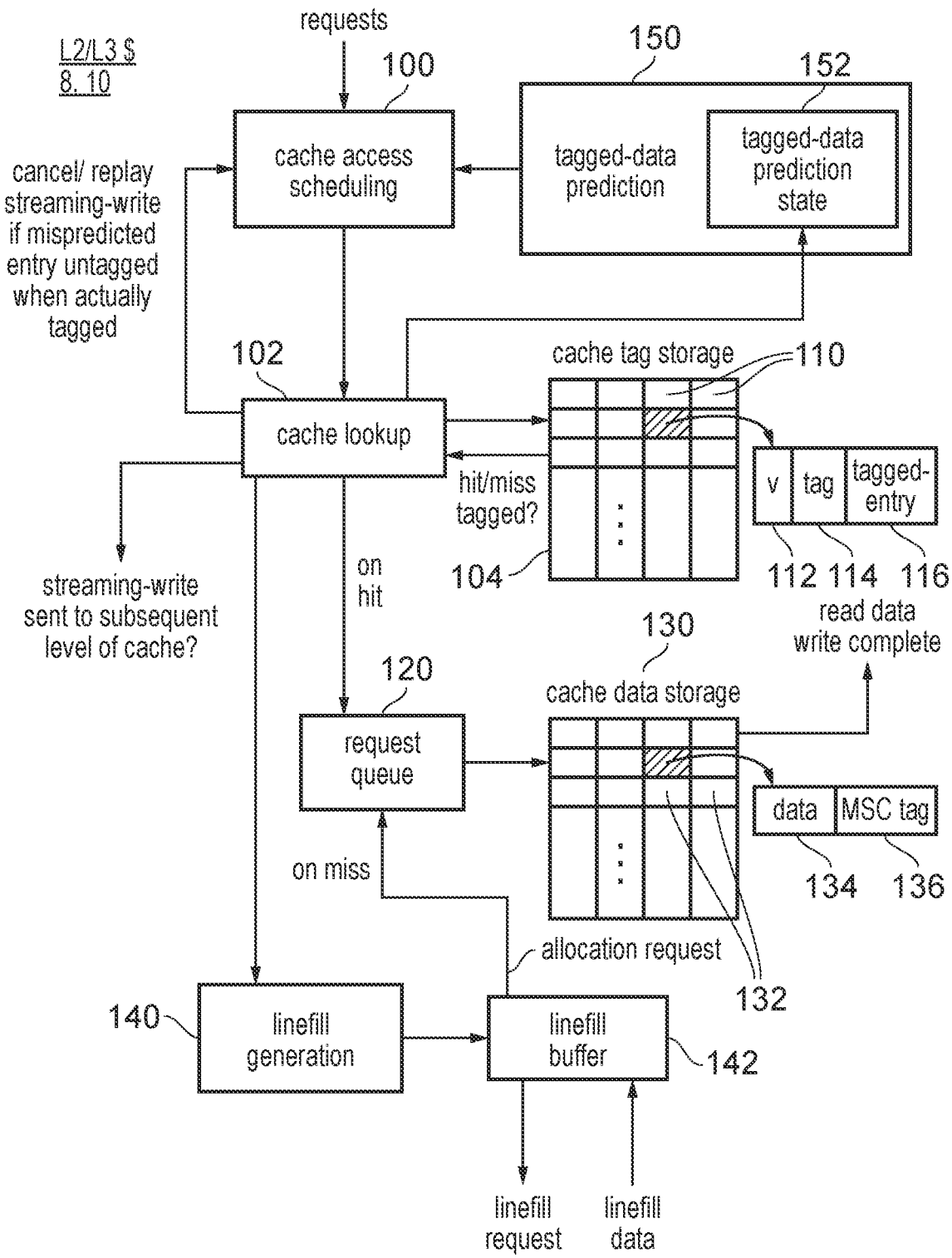
FIG. 5 illustrates an example of a level 2 or level 3 cache having tagged-data prediction circuitry and cache access scheduling circuitry to schedule access to cache data storage for a streaming-write request based on a tagged-data prediction indicating whether the streaming-write request is predicted to require access to a tagged cache data entry storing a memory safety check tag.

FIG. 5 illustrates circuitry at the L2 cache 8 or L3 cache 10 (examples of the "given level of cache" mentioned earlier). For conciseness, subsequent description is given assuming this cache is the L2 cache 8, but it will be appreciated the same could be applied to an L3 cache 10 or further level of cache other than L1.

The L2 cache 8 comprises cache access checking circuitry 100 for scheduling access to cache data storage 130 in response to requests received by the L2 cache 8. The requests received by the L2 cache 8 may include the linefill requests from the L1 cache 6, which may be processed in a similar to the read requests described for the L1 cache 6, in that they trigger cache lookup circuitry 102 to look up a corresponding set of tag entries 110 in cache tag storage 104 of the L2 cache 8 and compare the cache tag values 114 in each tag entry 110 of the looked up set with a cache tag derived from the target address of the linefill request. If one of the looked up cache tags 114 is valid (determined based on a valid indicator 112) and matches the cache tag derived from the target address, then a hit is detected and a read request is allocated to the request queue 120 for the L2 cache 8. When the read request is serviced, the cache data entry 132 of the cache data storage 130 corresponding to the tag entry 110 that had the matching cache tag is read, and cached data 134 returned from that cache data entry is returned to the earlier cache 6 that issued the linefill (read) request. If the read request misses in the L2 cache 8 then linefill generation circuitry 140 and a linefill buffer 142 may handle processing of linefill requests and cache allocation requests in a similar way to described above for the linefill request generation circuitry 80 and linefill buffer 84 described for the L1 cache 6 of FIG. 4.

However, when a streaming-write request is received at the L2 cache 8, the cache access scheduling circuitry 100 can select different access schedules for the streaming-write request. To support the tag checking operation described above with respect to FIG. 3, each cache data entry 132 of the cache data storage 130 has capacity to store a MSC tag 136 alongside the cached data 134 of that entry. The MSC tag value 136 of a given cache entry can be derived from the locations in the memory 12 at which a tag value has been stored for the block 50 of address space corresponding to the address of the cached data 134 cached in that entry. A tagged-entry identifier 116 stored within a corresponding tag entry 110 of the cache tag storage 104 indicates whether a given cache data entry 132 is a tagged cache data entry having a valid MSC tag 136 or an untagged cache data entry having an invalid MSC tag 136. When allocating new data into the L2 cache 8, a data structure indicating whether the address is in a tagged memory address region having associated MSC tags 52 or an untagged memory address region not having associated MSC tags 52 may be used to determine whether it is necessary to also load the MSC tag value 136 for the cached data 134, and hence how to set the tagged-entry identifier 116 for the corresponding cache tag entry 104. It can be beneficial to store the MSC tag value 136 in the cache data storage 130 rather than the cache tag storage 110, to reduce the power overhead of storing the MSC tag value 136. If the MSC tag 136 was stored in the tag entry 104, then as multiple tag entries 104 are read in parallel on each cache lookup, this would increase the number of bits to be read out on each cache tag lookup by A*M where A is the associativity (number of ways) of the cache data/tag storage 130, 110 and M is the number of bits in the MSC tag 136, which would greatly increase power consumption. In contrast, storing the MSC tag 136 in the cache data entry reduces the additional number of bits read out per cache data access to M bits.

Hence, it can be more energy efficient to store the MSC tag 136 in the cache data storage 130. However, this introduces complexity for a streaming-write operation, because the hardware for supporting write access to the cache data storage may not support the ability to update only selected bits of the data 134 held in a given cache data entry 132. Instead, a full line write may be performed to update all stored bits of the given cache data entry 132 in any given write operation. Therefore, if a given write request only needs to update a portion of the bits in a given cache data entry, this would be processed as a read-modify-write operation where a read access to the cache data entry 132 is scheduled to read out the previous contents of the entry, the read out data is modified while held in a location separate from the cache data entry 132 itself, and the modified data is then written back to the cache data entry 132 to overwrite all stored bits (although some of the overwritten bits may have the same bit value as corresponding bits previously stored). In the absence of support for MSC tags 136, partial line writes may be very rare as it may be that the main contributor to writes to the cache data storage 130 may be linefill operations from a subsequent level of cache 10 or memory 12, writebacks from the previous level of cache 6 or streaming-writes issued by the previous level of cache 6. However, with the added support for MSC tags 136 then streaming-writes from the L1 cache 6 may be processed as partial-line writes using a read-modify-write access schedule because the MSC tag 136 should be preserved even if all bytes of the data value 134 are being overwritten.

For streaming-write requests, processing all streaming-writes as a read-modify-write operation would introduce a performance penalty because the read access performed prior to the write introduces additional cycles in accessing the cache data storage 130. However, if the target cache data entry 132 targeted by the streaming-write request is an untagged entry (having the tagged-entry indicator 116 in the corresponding tag entry 104 set to indicate that the MSC tag field 136 is invalid), then the cycles taken to perform the read access would introduce an unnecessary delay since it would be acceptable to perform a full-line operation and overwrite all bits of the MSC tag value 136 with an arbitrary value as the MSC tag is invalid anyway.

Hence, to predict how to schedule cache access for a streaming-write request, the cache access scheduling circuitry 100 receives an indication of a tagged-data prediction made by tagged-data prediction circuitry 150, indicating whether the cache data entry 132 corresponding to the target address of the streaming-write request is predicted to be a tagged cache data entry or an untagged cache data entry. The tagged-data prediction circuitry 150 generates the tagged-data prediction before the tag lookup has been completed by cache lookup circuitry 102, allowing the timings by which access is made to the cache data storage 130 to be set earlier, which can speed up processing of the request compared to an approach which waited for the tag lookup to complete before selecting the cache access schedule. The tagged-data prediction is generated based on tagged-data prediction state 152 which is maintained based on outcomes of checking the tagged-entry identifier 116 on previous streaming-write requests. Hence, the tagged-data prediction can vary depending on the properties of a particular workload.

Without use of the tagged-data prediction state 152, the tagged-data prediction circuitry 150 might statically predict by default that all streaming-write requests will target a tagged cache data entry or that all streaming-write requests will target an untagged cache data entry. However, the first option (statically predict valid MSC tags 136 are present) would make all write streaming operations slower, even if accessing regions of address space that do not have associated MSC tags. This might cut bandwidth by a factor of 2 compared to implementations which do not support MSC tags at all, as a set of streaming-write requests which could previously be processed with a write access per write request now needs both a read access and a write access to the cache data storage 130 per write request.

On the other hand, the second option of statically predicting that no valid MSC tags 136 are present can keep higher bandwidth when accessing untagged memory addresses, but suffers very high penalties in case of accessing memory assigned MSC tags 52 for memory safety checking. In this case, each streaming-write may be scheduled initially to perform a full-line write (fully overwriting all bits of the target cache data entry), but once the tag lookup circuitry 102 identifies that the target cache data entry has a valid MSC tag 136, the streaming-write access may have to be cancelled and replayed using a read-modify-write access schedule. For runs of streaming-write requests to addresses assigned corresponding MSC tags 52, this could cut bandwidth by a factor of 3 compared to implementations not supporting MSC tags: 1 failed access for the cancelled attempt at write streaming, and then 2 further accesses for the read and write of the read-modify-write operation.

Hence, static prediction schemes may suffer from high performance penalties compared to write-streaming in systems not supporting MSC tags 52.

By providing tagged-data prediction circuitry 150 which provides a tagged-data prediction of whether the streaming-write request will hit against a tagged/untagged cache data entry 132, then provided prediction accuracy is high enough, which is a reasonable assumption as whether the target entry is tagged/untagged is highly correlated from one streaming-write to another, the average case performance can approach the 1× delay which would have been incurred for a standard write in a system not supporting MSC tags 52, rather than the 2× delay or 3× delay associated with static prediction schemes. The tagged-data prediction can sometimes be incorrect, and occasionally a streaming-write may be predicted as targeting an untagged cache data entry 132, but the subsequent cache tag lookup may determine based on the tagged-entry indicator 116 that the target address of the streaming-write corresponds to a tagged cache data entry. In this case, the cache lookup circuitry 102 may cancel the access scheduled for the streaming-write operation and replay the request to the cache access scheduling circuitry 100 to schedule a read-modify-write operation instead. However, such mispredictions are rare because mixed runs of streaming-write requests with some tagged accesses and some untagged accesses are very rare and so the transitions between a tagged access and an untagged access do not occur often.

Hence, it is possible to predict whether a given streaming-write will access a tagged/untagged entry based on the tagged-data prediction state 152 maintained based on whether one or more previous streaming-write requests hit on a tagged/untagged entry 132. If the tagged-data prediction state 152 indicates that the streaming-write request should be predicted as accessing a tagged cache data entry 132 having a valid MSC tag 136, the streaming-write is scheduled as a read-modify-write access, but if the tagged-data prediction state 152 indicates that the streaming-write request should be predicted as accessing an untagged cache data entry 132 not having a valid MSC tag 136 then the streaming-write is scheduled as a full-line write without a prior read access.

For a streaming-write, the cache lookup 102 is performed in a similar way to lookups for read/write requests, and if there is a hit in the cache for the target address then the tagged-entry identifier 114 is used to resolve whether the tagged-data prediction was correct, and trigger a cancellation of the scheduled access for the streaming-write if the tagged-data incorrectly predicted an untagged entry when the target cache data entry was actually tagged. In the event of a cache miss, a linefill/allocation may be triggered using the linefill generation circuitry 140 of the L2 cache 8, or alternatively the streaming-write request may be forwarded to the L3 cache 10 or a subsequent level of cache for processing at that cache. Whether the streaming-write request is processed at the L2 cache 8 or L3 cache 10 may be a matter for implementation choice, or could depend on dynamic monitoring of cache access heuristics.

Figure 6A:
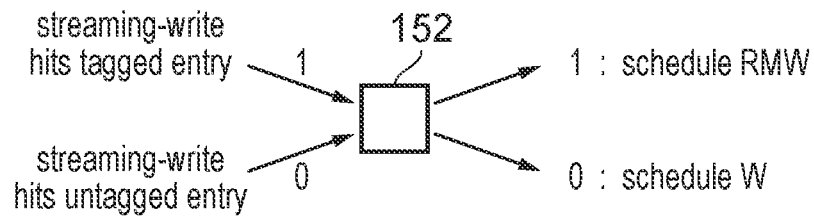
FIGS. 6A to 6C show examples of tagged-data prediction state for making the tagged-data prediction.
Figure 6B:
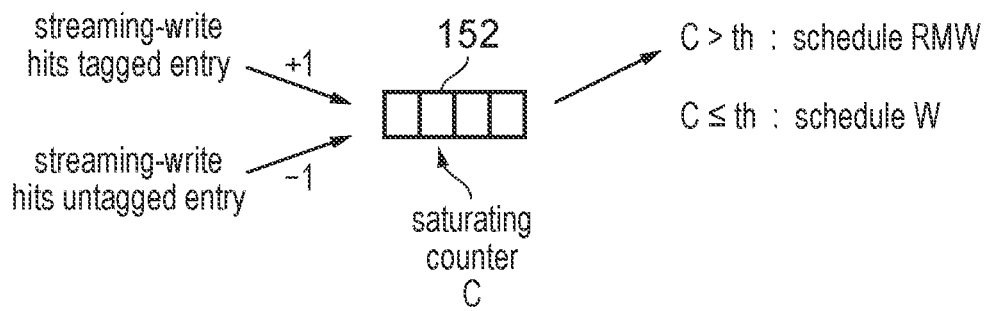
Figure 6C:
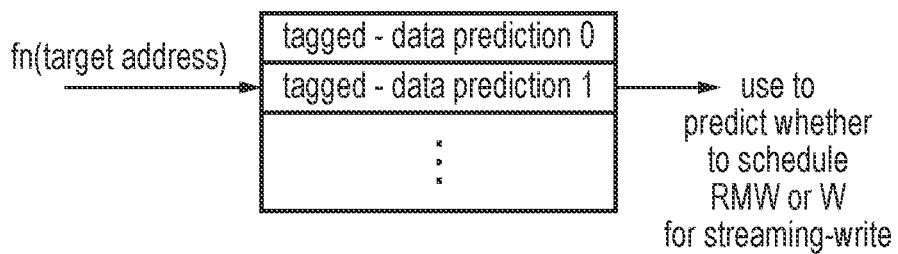

FIGS. 6A to 6C illustrate various examples for maintaining the tagged-data prediction state 152 based on outcomes of tag lookups for streaming-write requests.

FIG. 6A shows a first example in which a one-bit tracking indicator 152 is provided for tracking whether the most recent streaming-write request hit against a tagged cache data entry 132 or an untagged cache data entry 132. If a current streaming-write request is determined by cache lookup circuitry 102 to hit against a tagged cache data entry, the tracking indicator 152 is set to a first value (e.g. 1) and if the current streaming-write request is determined by the cache lookup circuitry 102 to hit against an untagged cache data entry then the tracking indicator 152 is set to a second value (e.g. 0). When making a tagged-data prediction for a given streaming-write, the tagged-data prediction circuitry 150 determines that the cache data entry 132 hit by the given streaming-write will be a tagged cache data entry if the current value of the tracking indicator 152 is the first value (and hence the cache access scheduling circuitry 100 will schedule a read modify write operation for the given streaming-write) and will be an untagged cache data entry if the current value of the tracking indicator 152 is the second value (and hence a full-line write would be scheduled for the given streaming-write request). The tracking indicator 152 can be considered equivalent to a 1-bit saturating counter.

FIG. 6B shows another example in which a saturating counter C with multiple bits is used as the prediction state 152. For this example, a streaming write which hits against a tagged entry causes the counter C to be updated in a first direction (e.g. incremented) and a streaming write which hits against an untagged entry causes the counter C to be updated in a second direction (e.g. decremented). When making a tagged-data prediction for a given streaming-write request, the tagged-data prediction circuitry 150 predicts that the target cache data entry for the given streaming-write request will be tagged if the count value C is greater than a threshold value th and predicts that the target cache data entry will be untagged if the current value C is less than or equal to the threshold. The counter C may be an indication of the relative frequency of streaming-writes which require access to tagged/untagged cache data entries within a recent group of streaming-write requests. Compared to the approach of FIG. 6A, this approach can provide slightly higher prediction accuracy for runs of streaming-write operations which include an occasional access with the opposite tagged/untagged status to the majority of accesses, since such occasional accesses would not prevent the next access in the run being predicted as having the majority tagged/untagged status, unlike FIG. 6A. In practice, however, the lower circuit area cost of FIG. 6A may justify choosing the approach of FIG. 6A, especially as runs of mixed tagged/untagged accesses are rare. Nevertheless, the multi-bit counter can also be used.

In the examples of FIGS. 6A and 6B, the prediction state 152 is global prediction state shared between all addresses of streaming-write requests, so that the prediction state 152 is looked up independent of the target address of a particular streaming-write request.

In contrast, in the example of FIG. 6C, a set of prediction state entries is provided each storing a tagged-data prediction indicator (which could be a 1-bit or multi-bit indicator according to one of the examples of FIGS. 6A and 6B). On making a tagged-data prediction for a given streaming-write request, the target address of the request is used to look up one of the tagged-data prediction entries, and the value of that entry is used to predict whether the target cache data entry accessed by that streaming-write request will be tagged or untagged (and hence whether to schedule a read modify write operation or a full-line write operation). Similarly, when updating the prediction state based on a resolved outcome of whether the target cache data entry for a particular streaming-write request is tagged/untagged, the entry to be updated is selected based on the target address of the resolved streaming-write request.

Figure 7:
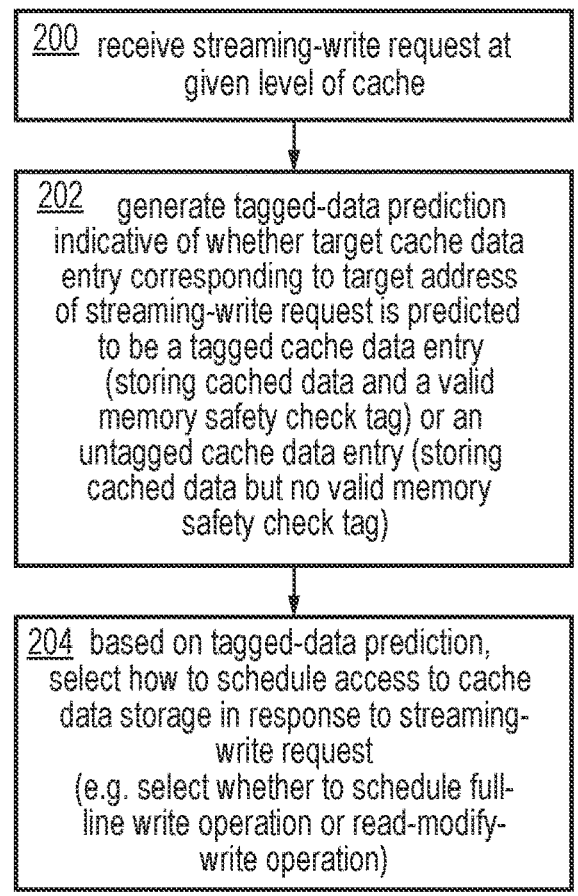
FIG. 7 illustrates steps for controlling access to a cache in response to a streaming-write request.

FIG. 7 illustrates steps for processing a streaming-write request at a given level of cache, e.g. the L2 cache 8 or L3 cache 10. At step 200, the streaming-write request is received, specifying a target address of a write request which missed in a previous level of cache of the cache hierarchy (e.g. the previous level of cache may be the L1 cache 6). In response the streaming-write request, at step 202 the tagged-data prediction circuitry 150 generates a tagged-data prediction which indicates whether a target cache data entry 132 corresponding to the target address of the streaming-write request is predicted to be a tagged cache data entry or an untagged cache data entry. Here, a tagged cache data entry is a cache data entry 132 storing cached data 134 and a valid memory safety check (MSC) tag 136, while an untagged cache data entry is a cache data entry storing cached data 134 without a valid MSC tag 136. At step 204, based on the tagged-data prediction generated by the tagged-data prediction circuitry 150, the cache access scheduling circuitry 100 selects how to schedule access to the cache data storage 130 in response to the streaming-write request. For example, the cache access scheduling circuitry 100 selects whether to schedule a full-line write operation or a read-modify-write operation in response to the streaming-write request.

Figure 8:
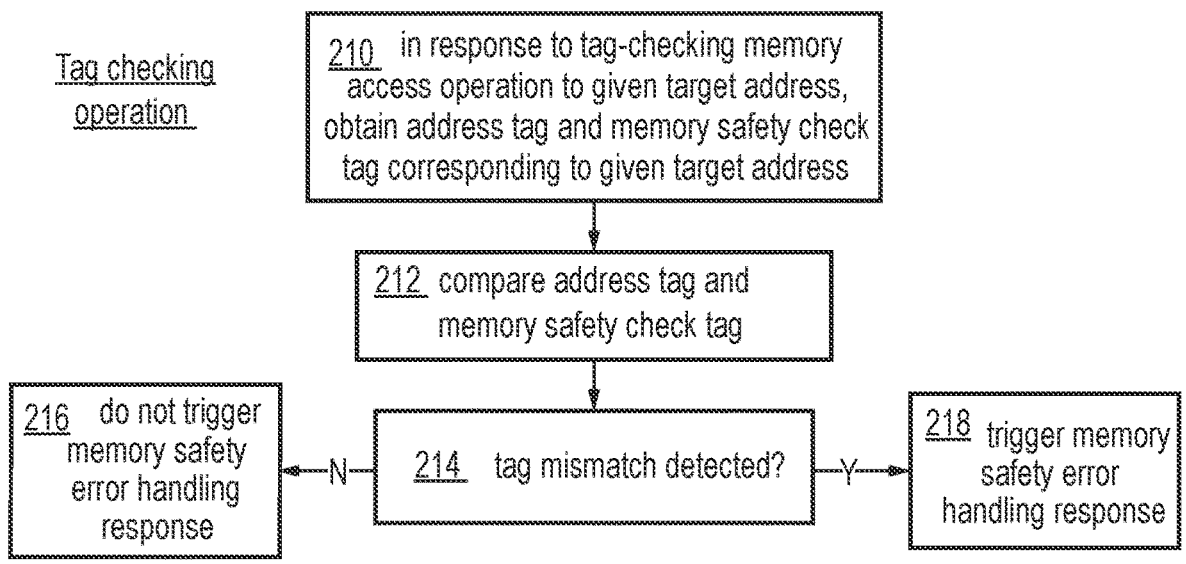
FIG. 8 illustrates steps for performing a tag checking operation.

FIG. 8 illustrates steps for performing a tag checking operation using the tag checking circuitry 34. While in FIG. 2 the tag checking circuitry 34 is shown as part of the processor 4, in other examples the address tag 60 derived from the address operand could be forwarded to tag checking circuitry 34 located closer to the cache or other storage location storing the MSC tag 52. At step 210, the tag checking circuitry 34, in response to a tag-checking memory access operation to a given target address, obtains an address tag 60 derived from the address operand used to compute the given target address and obtains a MSC tag 52 corresponding to the given target address that is stored in the memory system. For a read/write request hitting in the L2 cache 8 or L3 cache 10 shown in FIG. 5, the MSC tag 52 for the tag check can be obtained from the cache data storage 130 of the L2/L3 cache 8, 10, but for requests hitting at other cache levels or missing in all cache levels, the MSC tag 52 could be obtained from other locations in the memory system, e.g. from underlying memory 12. At step 212, the tag checking circuitry 34 compares the address tag 60 and the MSC tag 52, and at step 214 the tag checking circuitry 34 detects whether a tagged mismatch is detected (e.g. the tag mismatch can be detected if the values of the address tag 60 and the MSC tag 52 differ and neither the address tag 60 nor the MSC tag 52 has a match-all value which would be deemed to match against any value of the other tag). If the tags 60, 52 match (or are deemed to match due to "match all" functionality) then at step 216 the tag checking circuitry 34 determines there is no need to trigger any memory safety error handling response. If a tag mismatch is detected, then at step 218 the tag checking circuitry 34 triggers a memory safety error handling response, which could for example be signalling a fault, rejecting the memory access, setting an error flag in a control register, and/or writing information about the tag-checking memory access operation (such as its instruction address and/or target address) to an error report.

Figure 9:
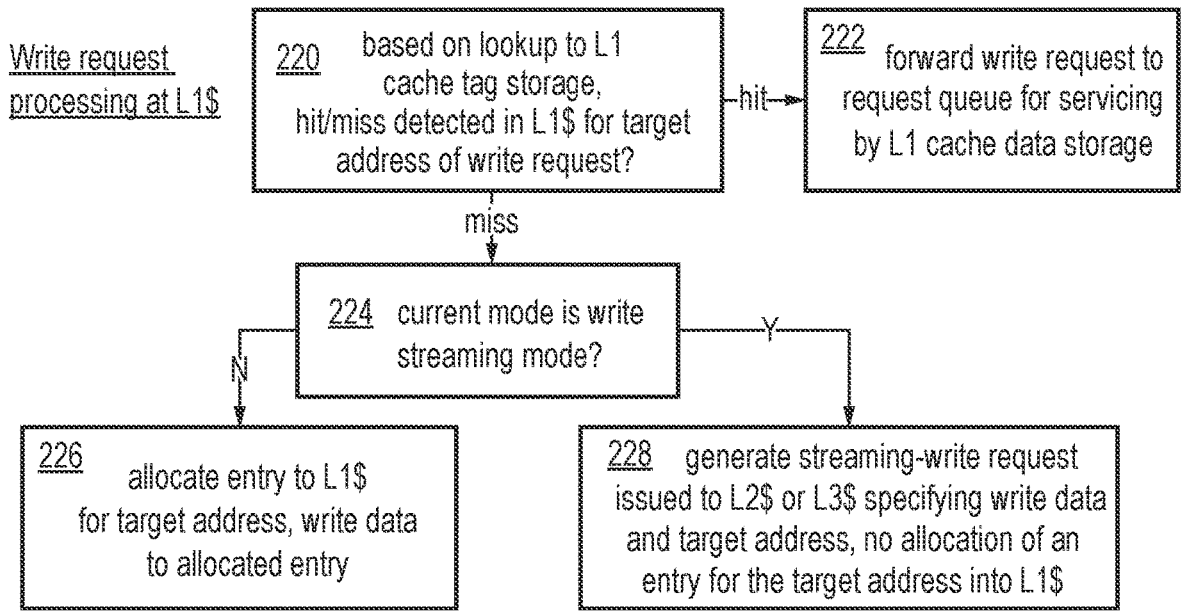
FIG. 9 illustrates steps performed to control handling of a write request which misses in a level 1 cache.

FIG. 9 illustrates steps for processing a write request at the L1 cache 6. At step 220, based on a lookup to the L1 cache tag storage 72, the cache lookup circuitry 70 determines whether a hit or miss is detected in the L1 cache 6 for the target address of the write request. If a hit is detected, the write request is forwarded to the request queue 74 for servicing by the L1 cache data storage 76. If a miss is detected, then at step 224 the write streaming control circuitry 80 determines, based on the current mode indicator 82, whether a current mode of operation is the write streaming mode. If the current mode is the non-write-streaming mode, then at step 226 a new entry is allocated into the L1 cache 6 for the target address of the write request (possibly following a linefill request being sent to subsequent levels of cache or to memory, if the write data of the write request needs to be merged with existing data in the same cache line), and the write data specified by the write request is written to the allocated L1 cache data entry in the L1 cache data storage 76. If the current mode is the write streaming mode, then at step 228 a streaming-write request is issued to the L2 cache 8 or the L3 cache 10 (which cache is the target of the streaming-write request may be fixed or may vary depending on current configuration inputs or monitoring of access patterns). The streaming-write request specifies the write data and the target address of the write request that missed in the L1 cache 6, and is issued without triggering any allocation of a new entry for the target address in the L1 cache 6.

Figure 10:
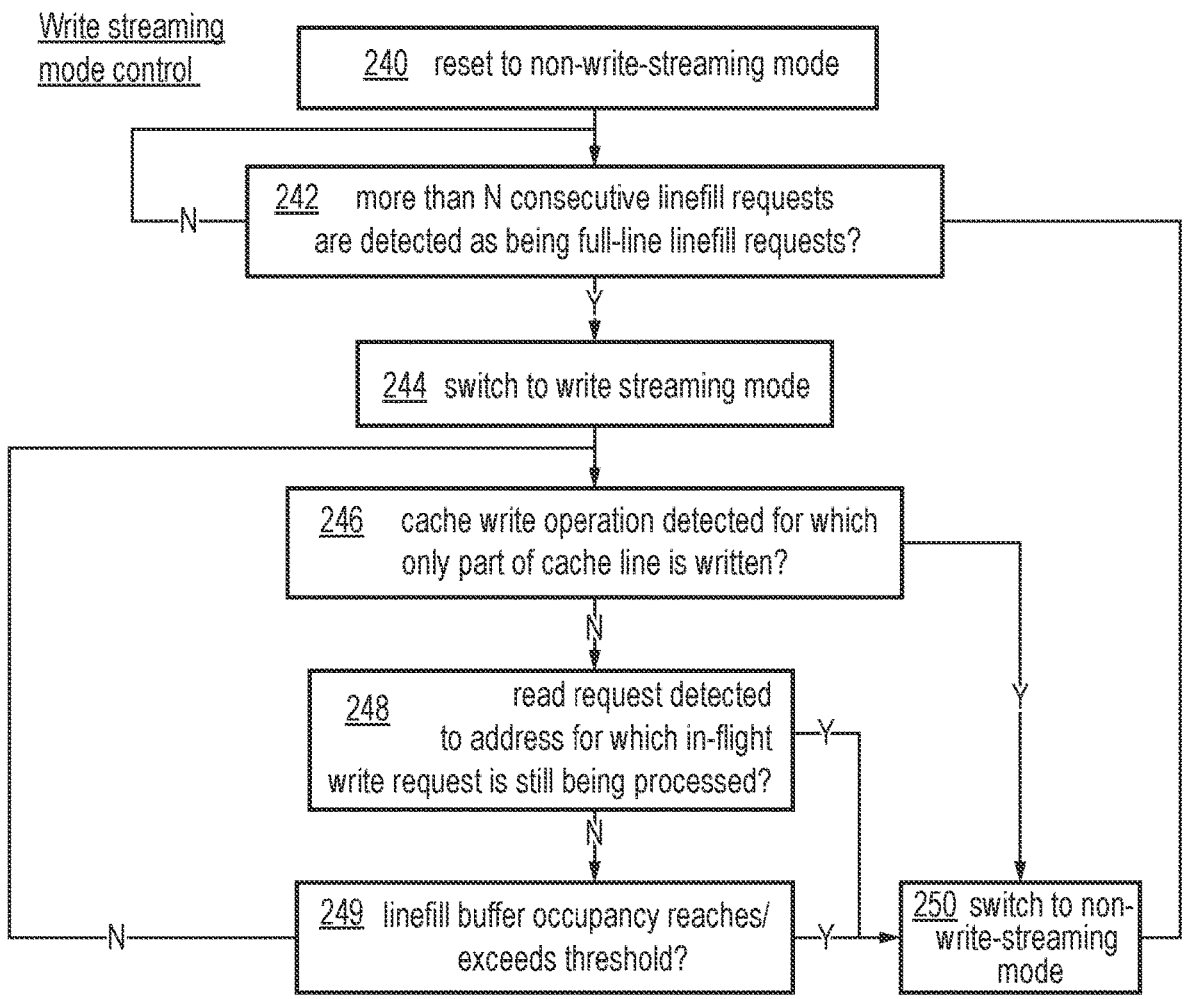
FIG. 10 illustrates steps for controlling whether a current mode is a non-write-streaming mode or a write-streaming mode.

FIG. 10 illustrates steps performed by write streaming mode selection circuitry 86 at the level 1 cache 6, to control whether the current mode of operation is the write streaming mode or the non-write-streaming mode. At step 240, at reset of the apparatus 2 (e.g. the reset may occur on power up or assertion of a reset signal), the current mode indicator 82 is reset to a value which indicates that the current mode is the non-write-streaming mode. At step 242, the mode selection circuitry 86 detects whether more than N consecutive linefill requests are detected as being full-line linefill requests. Here, a full-line linefill request may be a linefill request for which, by the time the linefill is completed and allocation of a cache line corresponding to the target address of the linefill request is made into the L1 cache 6, that cache line is fully filled with write data in all bytes of the cache line, where that write data could have come from a single write request writing to the entire cache line, or from a group of two or more write requests which collectively write to each byte of the cache line. In absence of detecting more than N consecutive full-line linefill requests, the current mode remains as the non-write-streaming mode. If more than N consecutive linefill requests are detected as being full-line linefill requests, then at step 244 the current mode is switched to be the write streaming mode. The threshold number of full-line linefill requests, N, for triggering a switch to the write streaming mode can be fixed (e.g. hardwired) or configurable, e.g. set based on a configuration input signal or based on information set by software (e.g. a memory-mapped register may be provided allowing software to update the threshold number N).

Once in the write streaming mode, the mode selection circuitry 86 checks for at least one type of streaming-mode cancellation event. Steps 246, 248 and 249 show three examples of such a streaming-mode cancellation event. At step 246, the mode selection circuitry 86 detects whether a cache write operation to the cache data storage 76 has been detected for which only part of a cache line is written. At step 248 the mode selection circuitry 86 detects whether a read request is detected to an address for which an in-flight write request is still pending. At step 249, the mode selection circuitry 86 detects whether occupancy of the linefill buffer 84 has reached/exceeded a threshold (e.g. that the number of linefill requests pending in the linefill buffer is greater than a threshold number). If any of the conditions checked at steps 246, 248, 249 are satisfied, then at step 250 the current mode is switched back to the non-write-streaming mode, and if none of these streaming-mode cancellation conditions is satisfied the current mode remains as the write streaming mode. While steps 246, 248, 249 are shown performed sequentially in FIG. 10, they could also be performed in a different order or in parallel.

Figure 11:
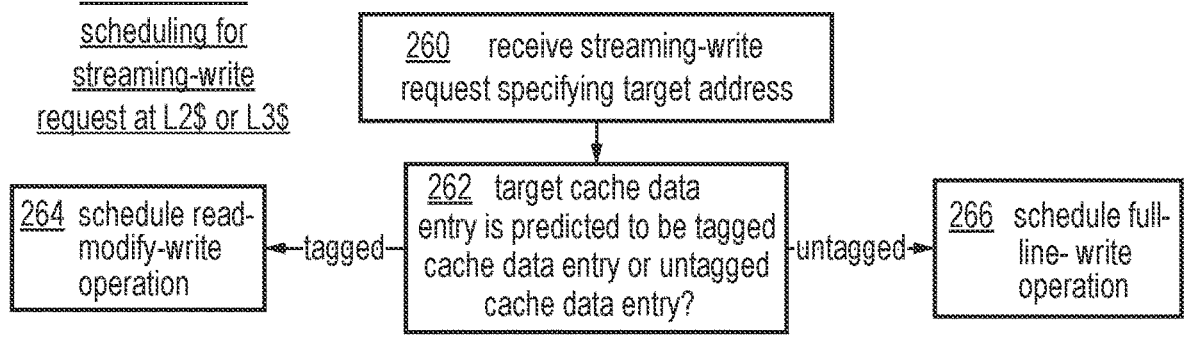
FIG. 11 illustrates steps for, based on a tagged-data prediction scheduling access to cache data storage in response to a streaming-write request.

FIG. 11 illustrates cache access scheduling performed by the cache access scheduling circuitry 100 in response to a streaming-write request received at the L2 cache 8 or L3 cache 10. At step 260, the cache access scheduling circuitry 100 receives the streaming-write request specifying a target address. At step 262, the tagged-data prediction circuitry 150 determines, based on the tagged-data prediction state 152, whether, if there was a hit in the L2 cache 8 or L3 cache 10 for the target address, the target cache data entry in the cache data storage 130 corresponding to the target address is predicted to be a tagged cache data entry having a valid MSC tag 136 or an untagged cache data entry not having any valid MSC tag 136. If the target cache data entry is predicted to be a tagged cache data entry then at step 264 a read-modify-write operation is scheduled for the streaming-write request. If the target cache data entry is predicted to be an untagged cache data entry then at step 266 a full-line-write operation is scheduled for the streaming-write request.

Figure 12:
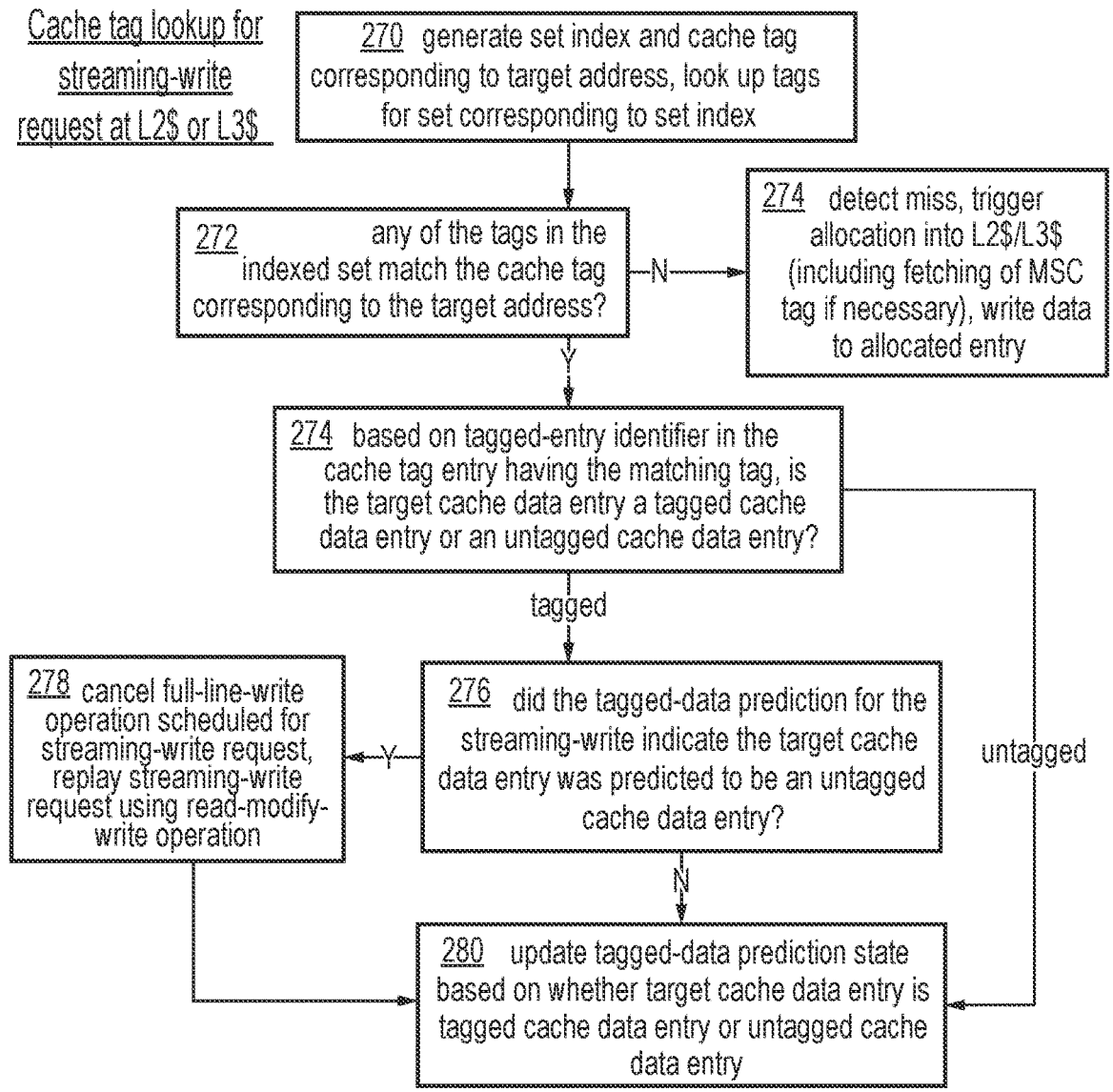
FIG. 12 illustrates steps for resolving the tagged-data prediction and updating tagged-data prediction state.

FIG. 12 illustrates steps performed during a cache tag lookup in response to a streaming-write request received at the L2 cache 8 or L3 cache 10. At step 270, the cache lookup circuitry 102 generates a set index and cache tag corresponding to the target address of the streaming-write request (the set index and cache tag can be generated according to any known index/tag hashing scheme). The cache lookup circuitry 102 looks up the cache tag storage 104 to obtain the cache tag values 114 in the set of cache tag entries corresponding to the set index generated for the target address. At step 272, the cache lookup circuitry 102 determines whether any of the cache tags 114 in valid cache tag entries of the indexed set match the cache tag generated at step 270 corresponding to the target address. If not, then at step 274 a cache miss is detected for the streaming-write request, and the linefill generation circuitry 140 triggers an allocation of a new entry into the L2/L3 cache for the data corresponding to the target address, with write data corresponding to the target address being written to that newly allocated entry. For example, the cache lookup circuitry 102 of the L2 cache 8 may, on a cache miss in the L2 cache for the streaming-write request, either control the linefill generation circuitry 140 of the L2 cache 8 itself to process the allocation into the L2 cache, or forward the streaming-write request to the L3 cache 10 where it may be processed in a similar way to the original streaming-write request received at the L2 cache 8. When an allocation into the L2 or L3 cache 8, 10 is performed, often a linefill request to a lower cache to obtain data of the newly allocated cache line may not be needed, as a streaming-write request may typically be a full-line write request which overwrites all bytes of the data 134 of that cache line. However, if the target address is in an address region for which a valid MSC tag 52 has been assigned by software (e.g. whether the address region is tagged with an MSC tag 52 may be identified based on a lookup of a tag assignment structure stored in the memory system 12), the MSC tag value 136 to write to the newly allocated cache data entry 130 may be fetched from a subsequent cache or the memory 12.

If any of the cache tags read at step 270 are determined at step 272 to match the cache tag derived from the target address, then a cache hit is detected and at step 274, based on the tagged-entry identifier 116 stored in the cache tag entry 110 which stored the matching cache tag, the cache lookup circuitry 102 determines whether the target cache data entry corresponding to the target address is a tagged cache data entry having a valid MSC tag 136 or an untagged cache data entry having an invalid MSC tag 136. If the target cache data entry is a tagged cache data entry then at step 276, the cache lookup circuitry 102 determines whether the tagged-data prediction for the streaming-write request indicated that the target cache data entry was predicted to be an untagged cache data entry. For example, a prediction flag passed to the cache lookup circuitry 102 by the cache access scheduling circuitry 100 along with the streaming-write request may specify whether the tagged-data prediction predicted an untagged or tagged cache data entry. If the target cache data entry is actually tagged but was predicted untagged, then at step 278 the previously scheduled full-line-write operation is cancelled for the streaming-write request, to prevent the valid MSC tag 136 in the target cache data entry being overwritten. The streaming-write request is replayed to the cache access scheduling circuitry 100, which reschedules a read-modify-write operation to be performed on the cache data storage 130 for the streaming-write request.

On the other hand, if either the target cache data entry was detected at step 274 to be an untagged entry, or at step 276 the tagged-data prediction was determined to have correctly predicted the target cache data entry as tagged, then there is no need to cancel the previously scheduled access to the cache data storage 130 for the streaming-write request. No cancellation is required even when an incorrect prediction of a tagged target cache data entry was made for the streaming-write but the target cache data entry is actually untagged, since in that case the scheduled read-modify-write operation includes a redundant read but still gives the correct result.

Regardless of the outcome of the prediction and whether the target cache data entry is actually tagged or untagged, at step 280 the tagged-data prediction state 152 can be updated based on whether the target cache data entry is resolved (based on the tagged-entry indicator 116 of the relevant cache tag entry 110) as being tagged or untagged.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 13:
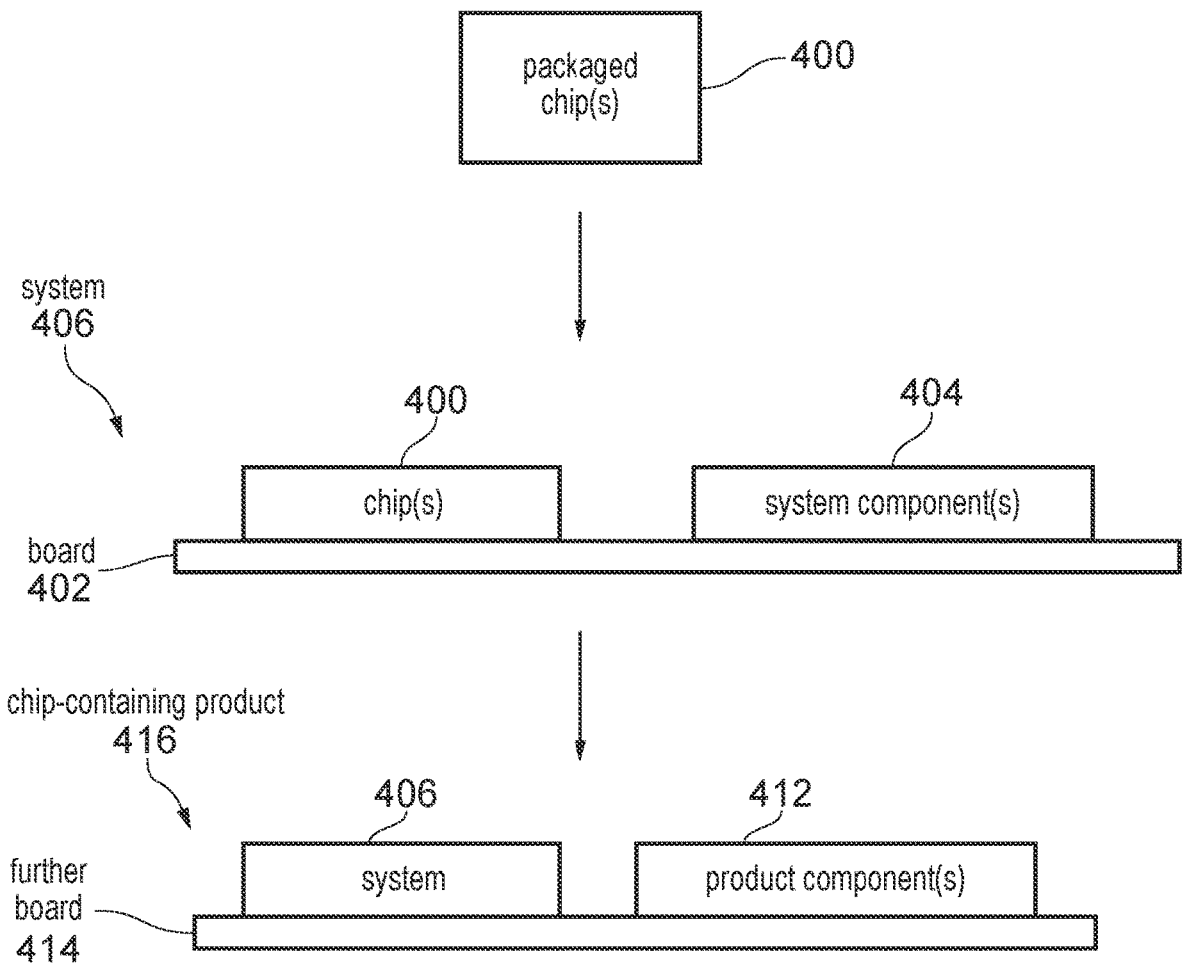
FIG. 13 illustrates a system and a chip-containing product.

As shown in FIG. 13, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:
1. An apparatus comprising:
   cache data storage to store data for a given level of cache, the cache data storage comprising a plurality of cache data entries;
   tagged-data prediction circuitry to generate a tagged-data prediction in response to a streaming-write request requesting that write data corresponding to a target address which missed in a previous level of cache is written to the cache data storage for the given level of cache without being allocated into the previous level of cache,
      the tagged-data prediction being indicative of whether a target cache data entry corresponding to the target address of the streaming-write request is predicted to be a tagged cache data entry that stores cached data associated with the target address and a valid memory safety check tag corresponding to the target address, or an untagged cache data entry that stores the cached data but does not store a valid memory safety check tag;
   and
   cache access scheduling circuitry to select, based on the tagged-data prediction generated by the tagged-data prediction circuitry for the streaming-write request, how to schedule access to the cache data storage in response to the streaming-write request.
2. The apparatus according to clause 1, in which the cache access scheduling circuitry is configured to determine, based on the tagged-data prediction made by the tagged-data prediction circuitry for the streaming-write request, whether to schedule a read access to the target cache data entry in response to the streaming-write request.
3. The apparatus according to any of clauses 1 and 2, in which the cache access scheduling circuitry is configured to determine, based on the tagged-data prediction made by the tagged-data prediction circuitry for the streaming-write request, whether to schedule a full-line-write operation or a read-modify-write operation in response to the streaming-write request.
4. The apparatus according to clause 3, in which:
   in response to the tagged-data prediction indicating that the target cache data entry is predicted to be an untagged cache data entry, the cache access scheduling circuitry is configured to schedule the full-line write operation for the streaming-write request; and
   in response to the tagged-data prediction indicating that the target cache data entry is predicted to be a tagged cache data entry, the cache access scheduling circuitry is configured to schedule the read-modify-write operation for the streaming-write request.
5. The apparatus according to any of clauses 1 to 4, comprising cache tag storage comprising a plurality of cache tag entries each to store a cache tag value indicative of an address associated with cached data stored in a corresponding cache data entry of the cache data storage.
6. The apparatus according to clause 5, in which each cache tag entry specifies a tagged-entry identifier indicative of whether the corresponding cache data entry is a tagged cache data entry or an untagged cache data entry.
7. The apparatus according to any of clauses 1 to 6, in which, in response to a determination that the tagged-data prediction incorrectly predicted the target cache data entry as being an untagged cache data entry when the target cache data entry is actually a tagged cache data entry:

the cache access scheduling circuitry is configured to cancel an access to the cache data storage previously scheduled for the streaming-write request based on the tagged-data prediction, and reschedule the streaming-write request based on the target cache data entry being a tagged cache data entry.

8. The apparatus according to any of clauses 1 to 7, in which the tagged-data prediction circuitry is configured to generate the tagged-data prediction based on tagged-data prediction state maintained based on whether one or more previous streaming-write requests were determined to require access to a tagged cache data entry or an untagged cache data entry.

9. The apparatus according to clause 8, in which the tagged-data prediction state comprises global tagged-data prediction state looked up independent of the target address of the streaming-write request.

10. The apparatus according to clause 8, in which the tagged-data prediction state comprises local tagged-data prediction state specific to a subset of addresses, the tagged-data prediction state being looked up dependent on the target address of the streaming-write request.

11. The apparatus according to any of clauses 8 to 10, in which the tagged-data prediction state is indicative of whether a most recent streaming-write request was determined to require access to a tagged cache data entry or an untagged cache data entry.

12. The apparatus according to any of clauses 1 to 11, in which the tagged-data prediction circuitry is configured to generate the tagged-data prediction based on a frequency-tracking indicator indicative of a relative frequency of previous streaming-write requests that required access to a tagged cache data entry.

13. The apparatus according to any of clauses 1 to 12, in which the tagged-data prediction circuitry is configured to generate the tagged-data prediction based on a counter;
the tagged-data prediction circuitry is configured to adjust the counter in a first direction, in response to detecting a streaming-write request that requires access to an untagged cache data entry; and
the tagged-data prediction circuitry is configured to adjust the counter in a second direction opposite to the first direction, in response to detecting a streaming-write request that requires access to a tagged cache data entry.

14. The apparatus according to clause 13, in which the counter comprises a 1-bit counter.

15. The apparatus according to clause 13, in which the counter comprises multiple bits.

16. The apparatus according to any of clauses 1 to 15, comprising write streaming control circuitry to determine, in response to a given write request for the target address missing in the previous level of cache, whether to issue a linefill request or the streaming-write request to the given level of cache in response to the miss for the given write request;
the linefill request comprising a request to obtain data corresponding to the target address from the given level of cache and allocate the obtained data into the previous level of cache.

17. The apparatus according to clause 16, in which the write streaming control circuitry is configured to determine whether to issue the linefill request or the streaming-write request in response to the miss for the given write request, based on analysis of previous data access patterns.

18. The apparatus according to any of clauses 16 and 17, in which:
the write streaming control circuitry is configured to switch to a write streaming mode in response to detecting more than a threshold number of consecutive linefill requests that are full-line linefill requests,
a full-line linefill request comprising a linefill request for which, by the time that linefill request completes, one or more write requests covering all bytes of a cache line corresponding to an address specified by the linefill request have already been detected;
the write streaming mode comprising a mode in which the streaming-write request is issued in response to the given write request missing in the previous level of cache.

19. The apparatus according to clause 18, in which in response to detecting a streaming-mode cancellation event, the write streaming control circuitry is configured to switch to a non-write-streaming mode in which the linefill request is issued in response to the given write request missing in the previous level of cache.

20. The apparatus according to clause 19, in which the streaming-mode cancellation event comprises detecting a cache write operation for which only part of a cache line is written.

21. The apparatus according to any of clauses 19 and 20, in which the streaming-mode cancellation event comprises detecting a read request to an address of a cache line for which an in-flight write request is still being processed.

22. The apparatus according to any of clauses 19 to 21, in which the streaming-mode cancellation event comprises detecting that a linefill buffer occupancy reaches or exceeds a threshold number of linefill requests.

23. The apparatus according to any of clauses 1 to 22, comprising tag checking circuitry to perform a tag checking operation in response to a tag-checking memory access operation specifying a given address operand for deriving a given target address, the tag checking operation comprising:
comparing a given address tag derived from the given address operand with a given memory safety check tag stored in a memory system in association with a block of one or more memory locations comprising an addressed location identified by the given target address; and
in response to a mismatch being detected between the given address tag and the given memory safety check tag, performing a memory safety error handling response.

24. The apparatus according to clause 23, in which the memory safety error handling response comprises one of: signalling a fault; and updating an error record.

25. A system comprising:
the apparatus of any of clauses 1 to 24, implemented in at least one packaged chip;
at least one system component; and
a board,
wherein the at least one packaged chip and the at least one system component are assembled on the board.

26. A chip-containing product comprising the system of clause 25 assembled on a further board with at least one other product component.

27. A non-transitory computer-readable medium to store computer-readable code for fabrication of an apparatus comprising:
cache data storage to store data for a given level of cache, the cache data storage comprising a plurality of cache data entries;

tagged-data prediction circuitry to generate a tagged-data prediction in response to a streaming-write request requesting that write data corresponding to a target address which missed in a previous level of cache is written to the cache data storage for the given level of cache without being allocated into the previous level of cache, the tagged-data prediction being indicative of whether a target cache data entry corresponding to the target address of the streaming-write request is predicted to be a tagged cache data entry that stores cached data associated with the target address and a valid memory safety check tag corresponding to the target address, or an untagged cache data entry that stores the cached data but does not store a valid memory safety check tag;

and cache access scheduling circuitry to select, based on the tagged-data prediction generated by the tagged-data prediction circuitry for the streaming-write request, how to schedule access to the cache data storage in response to the streaming-write request.

28. A method comprising:

receiving, at a given level of cache, a streaming-write request requesting that write data corresponding to a target address which missed in a previous level of cache is written to cache data storage for the given level of cache without being allocated into the previous level of cache;

in response to the streaming-write request, generating a tagged-data prediction indicative of whether a target cache data entry of the cache data storage corresponding to the target address of the streaming-write request is predicted to be a tagged cache data entry that stores cached data associated with the target address and a valid memory safety check tag corresponding to the target address, or an untagged cache data entry that stores the cached data but does not store a valid memory safety check tag; and selecting, based on the tagged-data prediction generated for the streaming-write request, how to schedule access to the cache data storage in response to the streaming-write request.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

cache data storage configured to store data for a given level of cache, the cache data storage comprising a plurality of cache data entries;

tagged-data prediction circuitry configured to generate a tagged-data prediction in response to a streaming-write request requesting that write data corresponding to a target address which missed in a previous level of cache is written to the cache data storage for the given level of cache without being allocated into the previous level of cache, the tagged-data prediction being indicative of whether a target cache data entry corresponding to the target address of the streaming-write request is predicted to be a tagged cache data entry that stores cached data associated with the target address and a valid memory safety check tag corresponding to the target address, or an untagged cache data entry that stores the cached data but does not store the valid memory safety check tag;

and cache access scheduling circuitry configured to select, based on the tagged-data prediction generated by the tagged-data prediction circuitry for the streaming-write request, how to schedule access to the cache data storage in response to the streaming-write request.

2. The apparatus according to claim 1, in which the cache access scheduling circuitry is configured to determine, based on the tagged-data prediction made by the tagged-data prediction circuitry for the streaming-write request, whether to schedule a read access to the target cache data entry in response to the streaming-write request.

3. The apparatus according to claim 1, in which the cache access scheduling circuitry is configured to determine, based on the tagged-data prediction made by the tagged-data prediction circuitry for the streaming-write request, whether to schedule a full-line-write operation or a read-modify-write operation in response to the streaming-write request.

4. The apparatus according to claim 3, in which:

in response to the tagged-data prediction indicating that the target cache data entry is predicted to be an untagged cache data entry, the cache access scheduling circuitry is configured to schedule the full-line write operation for the streaming-write request; and in response to the tagged-data prediction indicating that the target cache data entry is predicted to be a tagged cache data entry, the cache access scheduling circuitry is configured to schedule the read-modify-write operation for the streaming-write request.

5. The apparatus according to claim 1, comprising cache tag storage comprising a plurality of cache tag entries each to store a cache tag value indicative of an address associated with cached data stored in a corresponding cache data entry of the cache data storage.

6. The apparatus according to claim 5, in which each cache tag entry specifies a tagged-entry identifier indicative of whether the corresponding cache data entry is a tagged cache data entry or an untagged cache data entry.

7. The apparatus according to claim 1, in which, in response to a determination that the tagged-data prediction incorrectly predicted the target cache data entry as being an untagged cache data entry when the target cache data entry is actually a tagged cache data entry:

the cache access scheduling circuitry is configured to cancel an access to the cache data storage previously scheduled for the streaming-write request based on the tagged-data prediction, and reschedule the streaming-write request based on the target cache data entry being a tagged cache data entry.

8. The apparatus according to claim 1, in which the tagged-data prediction circuitry is configured to generate the tagged-data prediction based on tagged-data prediction state maintained based on whether one or more previous streaming-write requests were determined to require access to a tagged cache data entry or an untagged cache data entry.

9. The apparatus according to claim 8, in which the tagged-data prediction state is indicative of whether a most recent streaming-write request was determined to require access to a tagged cache data entry or an untagged cache data entry.

10. The apparatus according to claim 1, in which the tagged-data prediction circuitry is configured to generate the tagged-data prediction based on a frequency-tracking indicator indicative of a relative frequency of previous streaming-write requests that required access to a tagged cache data entry.

11. The apparatus according to claim 1, in which the tagged-data prediction circuitry is configured to generate the tagged-data prediction based on a counter;
the tagged-data prediction circuitry is configured to adjust the counter in a first direction, in response to detecting a streaming-write request that requires access to an untagged cache data entry; and
the tagged-data prediction circuitry is configured to adjust the counter in a second direction opposite to the first direction, in response to detecting a streaming-write request that requires access to a tagged cache data entry.

12. The apparatus according to claim 1, comprising write streaming control circuitry to determine, in response to a given write request for the target address missing in the previous level of cache, whether to issue a linefill request or the streaming-write request to the given level of cache in response to the miss for the given write request;
the linefill request comprising a request to obtain data corresponding to the target address from the given level of cache and allocate the obtained data into the previous level of cache.

13. The apparatus according to claim 12, in which the write streaming control circuitry is configured to determine whether to issue the linefill request or the streaming-write request in response to the miss for the given write request, based on analysis of previous data access patterns.

14. The apparatus according to claim 12, in which:
the write streaming control circuitry is configured to switch to a write streaming mode in response to detecting more than a threshold number of consecutive linefill requests that are full-line linefill requests,
a full-line linefill request comprising a linefill request for which, by the time that linefill request completes, one or more write requests covering all bytes of a cache line corresponding to an address specified by the linefill request have already been detected;
the write streaming mode comprising a mode in which the streaming-write request is issued in response to the given write request missing in the previous level of cache.

15. The apparatus according to claim 1, comprising tag checking circuitry to perform a tag checking operation in response to a tag-checking memory access operation specifying a given address operand for deriving a given target address, the tag checking operation comprising:
comparing a given address tag derived from the given address operand with a given memory safety check tag stored in a memory system in association with a block of one or more memory locations comprising an addressed location identified by the given target address; and
in response to a mismatch being detected between the given address tag and the given memory safety check tag, performing a memory safety error handling response.

16. The apparatus according to claim 15, in which the memory safety error handling response comprises one of:
signalling a fault; and
updating an error record.

17. A system comprising:
the apparatus of claim 1, implemented in at least one packaged chip;
at least one system component; and
a board,
wherein the at least one packaged chip and the at least one system component are assembled on the board.

18. A chip-containing product comprising the system of claim 17 assembled on a further board with at least one other product component.

19. A non-transitory computer-readable medium to store computer-readable code for fabrication of an apparatus comprising:
cache data storage to store data for a given level of cache, the cache data storage comprising a plurality of cache data entries;
tagged-data prediction circuitry to generate a tagged-data prediction in response to a streaming-write request requesting that write data corresponding to a target address which missed in a previous level of cache is written to the cache data storage for the given level of cache without being allocated into the previous level of cache,
the tagged-data prediction being indicative of whether a target cache data entry corresponding to the target address of the streaming-write request is predicted to be a tagged cache data entry that stores cached data associated with the target address and a valid memory safety check tag corresponding to the target address, or an untagged cache data entry that stores the cached data but does not store a valid memory safety check tag;
and
cache access scheduling circuitry to select, based on the tagged-data prediction generated by the tagged-data prediction circuitry for the streaming-write request, how to schedule access to the cache data storage in response to the streaming-write request.

20. A method comprising:
receiving, at a given level of cache, a streaming-write request requesting that write data corresponding to a target address which missed in a previous level of cache is written to cache data storage for the given level of cache without being allocated into the previous level of cache;
in response to the streaming-write request, generating a tagged-data prediction indicative of whether a target cache data entry of the cache data storage corresponding to the target address of the streaming-write request is predicted to be a tagged cache data entry that stores cached data associated with the target address and a valid memory safety check tag corresponding to the target address, or an untagged cache data entry that stores the cached data but does not store the valid memory safety check tag; and selecting, based on the tagged-data prediction generated for the streaming-write request, how to schedule access to the cache data storage in response to the streaming-write request.

* * * * *